(12) United States Patent
Azancot et al.

(10) Patent No.: US 8,629,577 B2
(45) Date of Patent: Jan. 14, 2014

(54) PINLESS POWER COUPLING

(75) Inventors: Yossi Azancot, Jerusalem (IL); Amir Ben-Shalom, Modiin (IL); Oola Greenwald, Mevasseret Zion (IL); Arik Rofe, Jerusalem (IL)

(73) Assignee: Powermat Technologies, Ltd, Neve Ilan (IL)

( * ) Notice: Subject to any disclaimer, the term of this patent is extended or adjusted under 35 U.S.C. 154(b) by 685 days.

(21) Appl. No.: 12/524,987

(22) PCT Filed: Jan. 28, 2008

(86) PCT No.: PCT/IL2008/000124
§ 371 (c)(1),
(2), (4) Date: Mar. 10, 2010

(87) PCT Pub. No.: WO2008/093334
PCT Pub. Date: Aug. 7, 2008

(65) Prior Publication Data
US 2010/0181841 A1    Jul. 22, 2010

Related U.S. Application Data

(60) Provisional application No. 60/897,868, filed on Jan. 29, 2007, provisional application No. 61/006,488, filed on Jan. 16, 2008, provisional application No. 60/935,694, filed on Aug. 27, 2007.

(51) Int. Cl.
*H01F 27/42* (2006.01)
*H01F 37/00* (2006.01)
*H01F 38/00* (2006.01)

(52) U.S. Cl.
USPC .......................................................... 307/104

(58) Field of Classification Search
USPC .......................................................... 307/104
See application file for complete search history.

(56) References Cited

U.S. PATENT DOCUMENTS

| 723,836 A | 3/1903 | Cowing |
| 2,415,688 A | 2/1947 | Hall |
| 3,771,085 A | 11/1973 | Hojo et al. |

(Continued)

FOREIGN PATENT DOCUMENTS

| EP | 0160990 A2 | 11/1985 |
| EP | 0357839 A1 | 3/1990 |

(Continued)

OTHER PUBLICATIONS

Liu et al. "An Analysis of a Double-layer Electromagnetic Shield for a Universal Contactless Battery Charging Platform", IEEE 2005,p. 1767-1772.

(Continued)

*Primary Examiner* — Carlos Amaya
(74) *Attorney, Agent, or Firm* — Brooks Kushman P.C.

(57) ABSTRACT

A pin-less power coupling arrangement comprising at least one pin-less power jack; the power jack comprising a primary coil shielded behind an insulating layer for inductive coupling to a pin-less power plug; said power plug comprising a secondary coil wherein said insulating layer is substantially flat and said power plug and said power jack may be aligned by an alignment means. Various such alignment means are discussed as are enabled surfaces for supporting inductive power jacks and inductive plugs coupled to various appliances.

8 Claims, 15 Drawing Sheets

(56) References Cited

U.S. PATENT DOCUMENTS

| | | | |
|---|---|---|---|
| 3,938,018 A | 2/1976 | Dahl |
| 4,160,193 A | 7/1979 | Richmond |
| 4,431,948 A | 2/1984 | Elder et al. |
| 4,754,180 A | 6/1988 | Kiedrowski |
| 4,977,515 A | 12/1990 | Rudden et al. |
| 5,221,877 A | 6/1993 | Falk |
| 5,278,771 A | 1/1994 | Nyenya |
| 5,367,242 A | 11/1994 | Hulman |
| 5,455,466 A | 10/1995 | Parks et al. |
| 5,486,394 A | 1/1996 | Stough |
| 5,528,113 A | 6/1996 | Boys et al. |
| 5,550,452 A | 8/1996 | Shirai et al. |
| 5,600,225 A | 2/1997 | Goto |
| 5,680,035 A | 10/1997 | Haim et al. |
| 5,713,939 A | 2/1998 | Nedungadi et al. |
| 5,734,254 A | 3/1998 | Stephens |
| 5,762,250 A | 6/1998 | Carlton et al. |
| 5,821,728 A | 10/1998 | Schwind |
| 5,821,731 A | 10/1998 | Kuki et al. |
| 5,907,285 A | 5/1999 | Toms et al. |
| 5,929,598 A | 7/1999 | Nakama et al. |
| 5,949,214 A | 9/1999 | Broussard et al. |
| 6,042,005 A | 3/2000 | Basile et al. |
| 6,127,799 A | 10/2000 | Krishnan |
| 6,211,649 B1 | 4/2001 | Matsuda |
| 6,230,029 B1 | 5/2001 | Hahn et al. |
| 6,396,935 B1 | 5/2002 | Makkonen |
| 6,436,299 B1 | 8/2002 | Barrman et al. |
| 6,441,589 B1 | 8/2002 | Frerking et al. |
| 6,484,260 B1 | 11/2002 | Scott et al. |
| 6,532,298 B1 | 3/2003 | Cambier et al. |
| 6,586,909 B1 | 7/2003 | Trepka |
| 6,624,616 B1 | 9/2003 | Frerking et al. |
| 6,644,557 B1 | 11/2003 | Jacobs |
| 6,673,250 B2 | 1/2004 | Kuennen et al. |
| 6,721,540 B1 | 4/2004 | Hayakawa |
| 6,731,071 B2 | 5/2004 | Baarman |
| 6,766,040 B1 | 7/2004 | Catalano et al. |
| 6,803,744 B1 | 10/2004 | Sabo |
| 6,825,620 B2 | 11/2004 | Kuennen et al. |
| 6,888,438 B2 | 5/2005 | Hui et al. |
| 6,894,457 B2 | 5/2005 | Germagian et al. |
| 7,019,620 B2 | 3/2006 | Bohler et al. |
| D519,275 S | 4/2006 | Shertzer |
| 7,043,060 B2 | 5/2006 | Quintana |
| 7,126,450 B2 | 10/2006 | Baarman et al. |
| 7,132,918 B2 | 11/2006 | Baarman et al. |
| 7,164,255 B2 | 1/2007 | Hui |
| 7,180,248 B2 | 2/2007 | Kuennen et al. |
| 7,180,265 B2 | 2/2007 | Naskali et al. |
| 7,210,940 B2 | 5/2007 | Baily et al. |
| 7,212,414 B2 | 5/2007 | Baarman |
| 7,224,086 B2 | 5/2007 | Germagian et al. |
| 7,233,319 B2 | 6/2007 | Johnson et al. |
| 7,262,700 B2 | 8/2007 | Hsu |
| D553,852 S | 10/2007 | Brandenburg |
| 7,385,357 B2 | 6/2008 | Kuennen et al. |
| 7,392,068 B2 | 6/2008 | Dayan et al. |
| 7,405,535 B2 | 7/2008 | Frerking et al. |
| 7,462,951 B1 | 12/2008 | Baarman |
| D586,809 S | 2/2009 | Jones et al. |
| 7,518,267 B2 | 4/2009 | Baarman |
| 7,522,878 B2 | 4/2009 | Baarman |
| 7,576,514 B2 | 8/2009 | Hui |
| D599,735 S | 9/2009 | Amidei et al. |
| D599,736 S | 9/2009 | Ferber et al. |
| D599,737 S | 9/2009 | Amidei et al. |
| D599,738 S | 9/2009 | Amidei et al. |
| D603,603 S | 11/2009 | Laine et al. |
| 7,612,528 B2 | 11/2009 | Baarman et al. |
| D607,879 S | 1/2010 | Ferber et al. |
| D611,407 S | 3/2010 | Webb |
| D611,408 S | 3/2010 | Ferber et al. |
| 2002/0057584 A1 | 5/2002 | Brockmann |
| 2002/0158512 A1 | 10/2002 | Mizutani et al. |
| 2003/0210106 A1 | 11/2003 | Cheng et al. |
| 2004/0023633 A1 | 2/2004 | Gordon |
| 2004/0195767 A1 | 10/2004 | Randall |
| 2004/0203537 A1 | 10/2004 | Yoshida et al. |
| 2004/0242264 A1 | 12/2004 | Cho |
| 2004/0261802 A1 | 12/2004 | Griffin et al. |
| 2005/0007067 A1 | 1/2005 | Baarman et al. |
| 2005/0083020 A1 | 4/2005 | Baarman |
| 2005/0130593 A1 | 6/2005 | Michalak |
| 2005/0164636 A1 | 7/2005 | Palermo et al. |
| 2005/0169506 A1 | 8/2005 | Fenrich et al. |
| 2005/0192062 A1 | 9/2005 | Mickle et al. |
| 2005/0233768 A1 | 10/2005 | Guo et al. |
| 2006/0028176 A1 | 2/2006 | Tang et al. |
| 2006/0043927 A1 | 3/2006 | Beart et al. |
| 2006/0052144 A1 | 3/2006 | Seil et al. |
| 2006/0061325 A1 | 3/2006 | Tang et al. |
| 2006/0071632 A1 | 4/2006 | Ghabra et al. |
| 2006/0091222 A1 | 5/2006 | Leung et al. |
| 2006/0093132 A1 | 5/2006 | Desormiere et al. |
| 2006/0202665 A1 | 9/2006 | Hsu |
| 2007/0023559 A1 | 2/2007 | Scapillato et al. |
| 2007/0057763 A1 | 3/2007 | Blattner et al. |
| 2007/0076459 A1 | 4/2007 | Limpkin |
| 2007/0136593 A1 | 6/2007 | Plavcan et al. |
| 2007/0165371 A1 | 7/2007 | Brandenburg |
| 2007/0182367 A1 | 8/2007 | Partovi |
| 2007/0202931 A1 | 8/2007 | Lee et al. |
| 2007/0210889 A1 | 9/2007 | Baarman et al. |
| 2007/0279002 A1 | 12/2007 | Partovi |
| 2008/0001922 A1 | 1/2008 | Johnson et al. |
| 2008/0030985 A1 | 2/2008 | Jeon et al. |
| 2008/0049988 A1 | 2/2008 | Basile et al. |
| 2008/0055047 A1 | 3/2008 | Osada et al. |
| 2008/0079388 A1 | 4/2008 | Sarnowsky et al. |
| 2008/0132293 A1 | 6/2008 | Gundlach et al. |
| 2008/0157715 A1 | 7/2008 | Rosenboom et al. |
| 2008/0223926 A1 | 9/2008 | Miller et al. |
| 2008/0258680 A1 | 10/2008 | Frerking et al. |
| 2008/0265835 A1 | 10/2008 | Reed et al. |
| 2009/0026959 A1 | 1/2009 | Lin et al. |
| 2009/0040807 A1 | 2/2009 | Doumae et al. |
| 2009/0047768 A1 | 2/2009 | Jain |
| 2009/0047769 A1 | 2/2009 | Bhat et al. |
| 2009/0075704 A1 | 3/2009 | Wang |
| 2009/0079387 A1 | 3/2009 | Jin et al. |
| 2009/0084705 A1 | 4/2009 | Justiss |
| 2009/0096413 A1* | 4/2009 | Partovi et al. .................. 320/108 |
| 2009/0097221 A1 | 4/2009 | Sayed et al. |
| 2009/0102416 A1 | 4/2009 | Burley |
| 2009/0134972 A1 | 5/2009 | Wu, Jr. et al. |
| 2009/0146608 A1 | 6/2009 | Lee |
| 2009/0153098 A1 | 6/2009 | Toya et al. |
| 2009/0153297 A1 | 6/2009 | Gardner |
| 2009/0174263 A1 | 7/2009 | Baarman et al. |
| 2009/0203355 A1 | 8/2009 | Clark |
| 2009/0212639 A1 | 8/2009 | Johnson |
| 2009/0226050 A1 | 9/2009 | Hughes |
| 2009/0243791 A1 | 10/2009 | Partin et al. |
| 2009/0251102 A1 | 10/2009 | Hui |
| 2009/0273891 A1 | 11/2009 | Peiker |
| 2009/0278494 A1 | 11/2009 | Randall |
| 2010/0039066 A1 | 2/2010 | Yuan et al. |

FOREIGN PATENT DOCUMENTS

| | | |
|---|---|---|
| EP | 0160990 B1 | 1/1991 |
| EP | 0558316 A1 | 9/1993 |
| EP | 0357829 B1 | 11/1994 |
| EP | 0845695 A2 | 6/1998 |
| EP | 1990734 A1 | 11/2008 |
| FR | 2695285 A3 | 3/1994 |
| FR | 2739929 A1 | 4/1997 |
| GB | 778072 | 7/1957 |
| GB | 2399466 A | 9/2001 |
| GB | 2399466 B | 11/2005 |
| GB | 2429372 A | 2/2007 |
| JP | 01-309579 A | 12/1989 |
| JP | 7-36556 U | 7/1995 |

(56) References Cited

FOREIGN PATENT DOCUMENTS

| | | |
|---|---|---|
| JP | 10-261533 A | 9/1998 |
| JP | 2000-092752 | 3/2000 |
| JP | 2001309579 | 11/2001 |
| JP | 2005327845 A | 11/2005 |
| WO | 93/21585 A1 | 10/1993 |
| WO | 9602879 A1 | 2/1996 |
| WO | 98/52350 A1 | 11/1998 |
| WO | 0201557 A1 | 1/2002 |
| WO | 0215320 A1 | 2/2002 |
| WO | 2005043775 A1 | 5/2005 |
| WO | 2006015143 A2 | 2/2006 |
| WO | 2008030985 A2 | 3/2008 |
| WO | 2008086080 A2 | 7/2008 |
| WO | 2008093334 A2 | 8/2008 |
| WO | 2008114268 A2 | 9/2008 |
| WO | 2009040807 A2 | 4/2009 |
| WO | 2009047768 A2 | 4/2009 |
| WO | 2009047769 A2 | 4/2009 |
| WO | 2009049657 A1 | 4/2009 |
| WO | 2009108958 A1 | 9/2009 |
| WO | 2010025156 A1 | 3/2010 |
| WO | 2010025157 A1 | 3/2010 |

OTHER PUBLICATIONS

Hui et al. "A New Generation of Universal Contactless Battery Charging Platform for Portable Consumer Electronic Equipment", IEEE Transactions on Power Electronics May 2005, vol. 20, No. 3, p. 620-627.

Liu et al. "Equivalent Circuit Modeling of a Multilayer Planar Winding Array Structure for Use in a Universal Contactless Battery Charging Platform", IEEE Transactions on Power Electronics Jan. 2007, vol. 22, No. 1, p. 21-29.

Tang et al. "Evaluation of the Shielding Effects on Printed-Circuit-Board Transformers Using Ferrite Plates and Copper Sheets", IEEE Transactions on Power Electronics Nov. 2002, vol. 17, No. 6, p. 1080-1088.

Su et al. "Extended Theory on the Inductance Calculation of Planar Spiral Windings Including the Effect of Double layer Electromagnetic Shield", IEEE 2007, p. 3022-3028.

Liu et al. "Optimal Design of a Hybrid Winding Structure for Planar Contactless Battery Charging Platform", IEEE Transactions on Power Electronics Jan. 2008, vol. 23, No. 1, p. 455-463.

Liu et al. "Simulation Study and Experimental Verification of a Universal Contactless Battery Charging Platform With Localized Charging Features", IEEE Transactions on Power Electronics Nov. 2007, vol. 22, No. 6, p. 2202-2210.

International Search Report for PCT/IL2009/000915, Completed by the European Patent Office on Mar. 15, 2010, 3 Pages.

International Search Report and Written Opinion for PCT/IL2008/001282, Both completed by the US Patent Office on Feb. 25, 2009, All together 9 Pages.

International Search Report and Written Opinion for PCT/IL2008/001347, Both completed by the US Patent Office on Feb. 2, 2009, All together 10 Pages.

International Search Report and Written Opinion for PCT/IL2008/001348, Both completed by the US Patent Office on Jan. 28, 2009, All together 9 Pages.

International Search Report for PCT/IL08/01641, Completed by the US Patent Office on May 21, 2009, 3 Pages.

International Search Report for PCT/IL2008/000124, Completed by the European Patent Office on Nov. 3, 2008, 5 Pages.

International Search Report for PCT/IL09/00544, Completed by the US Patent Office on Sep. 16, 2009, 1 Page.

International Search Report for PCT/IL2009/000681, Completed by the European Patent Office on Sep. 16, 2009, 3 Pages.

Hatanaka et al. "Power Transmission of a Desk With a Cord-Free Power Supply", IEEE Transactions on Magnetics Sep. 2002, vol. 38, No. 5, p. 3329-3331.

Chwang et al. "Thin film encapsulated flexible organic electroluminescent displays", Applied Physics Letters Jul. 21, 2003, vol. 83, No. 3, p. 413-415.

Office Action including English Translation dated Jun. 20, 2013, for corresponding Chinese Application 200880010328.4 filed May 15, 1998.

Office Action including English Translation dated Aug. 20, 2013, for corresponding Japanese Application 2009-546862.

\* cited by examiner

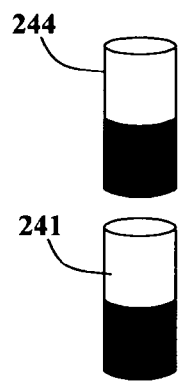
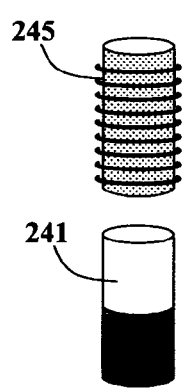
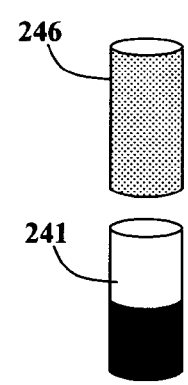
Fig. 5a         Fig. 5b         Fig. 5c
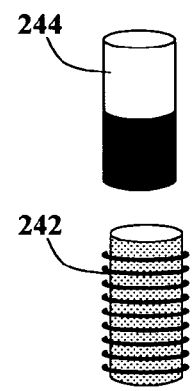
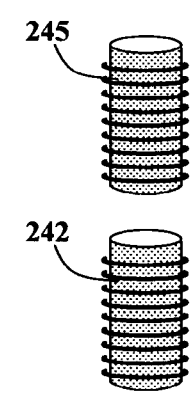
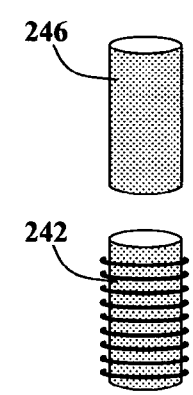
Fig. 5d         Fig. 5e         Fig. 5f
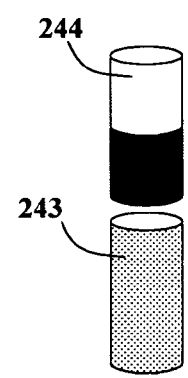
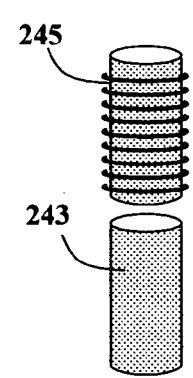
Fig. 5g         Fig. 5h

PINLESS POWER COUPLING

CROSS-REFERENCE TO RELATED APPLICATIONS

This application is a national phase of PCT/IL2008/000124 filed Jan. 28, 2008, which claims the benefit of U.S. Provisional Application 60/897,868 filed Jan. 29, 2007, U.S. Provisional Application 61/006,488 filed Jan. 16, 2008, and U.S. Provisional Application 60/935,694 filed Aug. 27, 2007, the disclosures of which are incorporated in their entirety by reference herein.

FIELD OF THE INVENTION

The present invention is directed to providing a pinless power coupling system. More particularly the invention is related to efficient inductive power transmission across substantially flat surfaces.

BACKGROUND

Electrical connections are commonly facilitated by the use of plugs and jacks. Power jacks are fixed connectors which are stationary relative to the surface into which they are embedded. Power plugs are movable connectors which are adapted to electrically couple with power jacks. The plug-jack coupling allows a movable device hardwired to the plug to be selectively connected to a power jack and disconnected and removed when required. In such electrical couplings it is common for the plug and jack to be mechanically coupled together and conductively connected using a pin and socket combination. The pin and socket coupling provides a way to align the plug to the jack efficiently and to prevent the two from becoming disconnected while in use and the pin, typically copper or brass, forms a conducting contact with a conductive element lining the socket. Where power is being transmitted, such as in a mains power point, where there is a danger of injury from electrocution, it is common that the pin is provided on the plug so that the live power lines may be safely shielded within the sockets of the power jack. Nevertheless, since the live power lines are not fully insulated there is a risk of injury associated with mains sockets, particularly to children who may be tempted to push small fingers or other objects into a live socket. It is therefore common to provide additional protection such as through the use of socket guards and the like.

Moreover, a socket if not maintained, collects dust which may impede electrical connection or even clog the socket, making insertion of the pin difficult. For this reason, power sockets are typically mounted upon walls and are not angled upwards. This configuration also reduces the risk of shorting or electrocution as a result of liquid spillages.

Inductive power connectors for providing insulated electrical connection are known. For example U.S. Pat. No. 7,210,940 to Baily et al. describes an inductive coupling for transferring electrical energy to or from a transducer and measuring circuit. Baily's system consists of a male connector having a single layer solenoid wound on a ferromagnetic rod and a female connector having a second single layer solenoid. By inserting the male connector into the female connector, the two solenoids are brought into alignment, enabling inductive energy transfer therebetween. This coupling provides a sealed signal connection without the disadvantages of having exposed contact surfaces.

In Baily's system the female connector still represents a socket and the male connector a pin. Although there are no exposed contact surfaces, such electrical power jacks cannot be located upon surfaces which need to be flat such as table tops, counters and the like. Because such surfaces are often precisely where electrical connection would be most convenient, this results in unsightly and inconvenient, extensive power connecting cables.

Other electrical power transmission systems allowing a power receiving electrical device to be placed anywhere upon an extended base unit covering a larger area have been proposed. These provide freedom of movement without requiring the trailing wires inherent in Baily. One such example is described in U.S. Pat. No. 7,164,255 to Hui. In Hui's system a planar inductive battery charging system is designed to enable electronic devices to be recharged. The system includes a planar charging module having a charging surface on which a device to be recharged is placed. Within the charging module, and parallel to the charging surface, is at least one, and preferably an array of primary windings that couple energy inductively to a secondary winding formed in the device to be recharged. Hui's system also provides secondary modules that allow the system to be used with conventional electronic devices not supplied with secondary windings.

Such systems are adequate for charging batteries, in that they typically provide a relatively low power inductive coupling. It will be appreciated however, that extended base units such as Hui's charging surface which allows energy transfer approximately uniformly over the whole area of the unit, are not generally suitable for providing the high energy requirements of many electric devices.

U.S. Pat. No. 6,803,744, to Sabo, titled "Alignment independent and self aligning inductive power transfer system" describes an inductive power transfer device for recharging cordless appliances. It also addresses the problem of pinlessly aligning a secondary inductive coil to a primary inductive coil. Sabo's device includes a plurality of inductors arranged in an array and connected to a power supply via switches which are selectively operable to activate the respective inductors. The inductors serve as the primary coil of a transformer. The secondary coil of the transformer is arranged within the appliance. When the appliance is positioned proximate to the power transfer device with the respective coils in alignment, power is inductively transferred from the device to the appliance via the transformer.

Nevertheless the need remains for a cost effective and efficient pinless power coupling mechanism and the present invention addresses this need.

SUMMARY OF THE INVENTION

It is an aim of the invention to provide a pinless power coupling arrangement comprising at least one pinless power jack comprising a primary coil shielded behind an insulating layer for inductive coupling to a pinless power plug comprising a secondary coil wherein the insulating layer is substantially flat and the pinless power plug and the power jack are alignable by an alignment means.

Typically the alignment between said power plug and said power jack is maintained whilst said power plug is rotated through 360 degrees about a central axis.

Optionally the alignment is being selected from visual, audible and tactile means.

Optionally the insulating layer is translucent allowing direct visual alignment.

Alternatively insulating layer is visually marked to indicate the location of the power jack allowing direct visual alignment.

Optionally the alignment means comprises an illuminated indicator configured to indicate when a plug is aligned to the power jack.

Typically the illuminated indicator is selected from the group comprising LEDs, an LED scale, and LCD screens.

Preferably the visual indicator is configured to provide a graduated indication of proximity to full alignment.

Optionally, the alignment means comprises an audible indicator configured to indicate when a plug is aligned to the power jack.

Typically the audible indicator is selected from the group comprising at least one buzzer, at least one bell, at least one speaker, at least one clapper and any combination thereof.

Optionally, the audible indicator is configured to provide graduated indication of proximity to alignment.

Preferably the alignment means is a tactile indicator comprising at least one magnetic snag configured to couple with at least one magnetic anchor carried by the pinless power plug.

In preferred embodiments the magnetic snag has an annular configuration such that an annular magnetic anchor engages said magnetic snag at any angle.

Typically the magnetic snag is selected from the group comprising at least one permanent magnet, at least one electromagnet and at least one ferromagnetic element. Optionally the magnetic anchor is selected from the group comprising at least one permanent magnet, at least one electromagnet and at least one ferromagnetic element. Preferably the polarities of the magnetic snag and magnetic anchor are selected such that the power plugs will only align with compatible power jacks.

Alternatively the alignment means is a tactile indicator selected from the group comprising at least one sucker, at least one hook-and-loop arrangement, at least one ridge-and-groove arrangement and combinations thereof.

It is a further aim of the invention to provide a power surface comprising an array of pinless power jacks.

Typically the power surface is a horizontal work surface. Alternatively, the power surface is a vertical wall. Alternatively again, the power surface is a ceiling.

Still another aim of the invention is to provide a pinless power plug comprising at least one secondary coil for inductive coupling to a pinless power jack shielded behind an insulating layer wherein the insulating layer is substantially flat and the power plug and the power jack are alignable by an alignment means.

Optionally, the pinless power plug comprises at least two secondary coils. Preferably the pinless power plug is adapted for coupling with an array of said primary coils wherein said at least two secondary coils are offset by a distance which is different to the intercoil spacing of said array of said primary coils.

Optionally the alignment means comprises a visual indicator configured to indicate when the plug is aligned to a power jack.

Typically the visual indicator is selected from the group comprising Light Emitting Diodes (LEDs), LED scales and LCD screens.

Preferably the visual indicator is configured to provide a graduated indication of proximity to full alignment.

Optionally the alignment means comprises an audible indicator configured to indicate when the plug is aligned to a power jack.

Typically this audible indicator is selected from the group comprising buzzers, bells, speakers, clappers and combination thereof.

Optionally the audible indicator is configured to provide a graduated indication of proximity to full alignment.

Preferably the alignment means is a tactile indicator comprising at least one magnetic anchor configured to couple with at least one magnetic snag of at least one pinless power jack.

Typically magnetic anchor is selected from the group comprises elements selected from the list of permanent magnets, electromagnets and ferromagnetic elements.

Alternatively the alignment means is a tactile indicator.

Alternatively the alignment means is selected from the group comprising suckers, hook-and-loop arrangements, corresponding ridge-and-groove arrangements and combinations thereof.

Optionally the pinless power plug is connectable to at least one electric load by a power cord.

Alternatively the pinless power plug is hardwired to at least one electric load.

In another aspect, the present invention is directed to providing a pinless power plug and an electric device permanently coupled together in a unitary device.

One embodiment of the invention is directed to a light fitting comprising a pinless power plug coupled to a light source.

In another embodiment, the pinless power plug is coupled to a a traveling power socket having at least one socket for pinned plugs and serves as an adaptor for retrofitting power devices of the prior art to power jacks of the invention.

Preferably the pinless power jack provides power in the range of between 1 watt and 200 watts. Typically the pinless power jack provides power in the range of between 5 watts to 110 watts.

In preferred embodiments of the invention, the power coupling additionally comprises a regulator. Optionally the regulator is a signal transfer system.

It is therefore another aim of the present invention to provide a signal transfer system for regulating power transfer between a primary coil behind a surface layer and a secondary coil brought into alignment with the primary coil; the signal transfer system comprising at least one optical transmitter in front of a surface layer for transmitting electromagnetic radiation of a type and intensity capable of penetrating the surface layer and being received by at least one optical receiver behind the surface layer.

Preferably the optical transmitter comprises a light emitting diode. Optionally the optical transmitter transmits an infra red signal. Typically, the optical receiver is selected from the group comprising: phototransistors, photodiodes and light dependent resistors.

In preferred embodiments the surface layer is constructed from a material selected from the group comprising glass, plastic, mica, formica, wood, wood veneer, canvas, cardboard, stone, linoleum and paper. Optionally, the surface layer comprises a generally opaque panel punctuated by at least one optical path for guiding the optical signal to the optical receiver. Typically, the optical path is selected from the group comprising: waveguides, optical fibers and windows.

The optical signal may carry encoded data pertaining to at least one of the group comprising:
  presence of an electric load;
  required operating voltage for the electric load;
  required operating current for the electric load;
  required operating temperature for the electric load;
  measured operating voltage for the electric load;
  measured operating current for the electric load;
  measured operating temperature for the electric load, and
  a user identification code.

Optionally, the inductive energy couple is a device selected from the group comprising: a transformer, a DC-to-DC converter, an AC-to-DC converter, an AC-to-AC converter, a flyback transformer, a flyback converter, a full-bridge converter, a half-bridge converter and a forward converter. Typically, the primary coil is galvanically isolated from the secondary coil.

In preferred embodiments the optical receiver is coaxial with said primary coil and said optical receiver is coaxial with said secondary coil such that when said primary coil is aligned to said secondary coil, and said optical receiver is aligned to said optical transmitter.

A further aspect of the invention is directed to provide a method for regulating power transfer across an inductive coupling comprising a primary coil behind a surface layer and a secondary coil in front of the surface layer, the method comprising the following steps:

a. providing at least one optical transmitter in front of the surface layer;
b. providing at least one optical receiver behind the surface layer;
c. communicating a regulating signal to the optical transmitter;
d. the optical transmitter transmitting the regulating signal as electromagnetic radiation of a type and intensity capable of penetrating the surface layer;
e. receiving the electromagnetic radiation by the optical receiver; and
f. adjusting the power transfer according to the regulation signal.

Optionally, the regulation signal carries details of power requirements of the load. Typically, the method regulates power transfer across an inductive coupling wherein the optical signal is provided by monitoring at least one operating parameter of the electric load and encoding the monitored parameter data into the optical signal. Alternatively or additionally, the method regulates power transfer across an inductive coupling wherein the optical signal carries data pertaining to at least one parameter selected from the group comprising operating voltage, operating current and operating temperature. Preferably, the method comprises the preliminary step of detecting the presence of an electric load.

The term "jack" as used herein refers to any fixed connector for receiving and for providing power to an electrical plug. The term "jack" is not defined by the gender of the connector and does not indicate having sockets for receiving protruding pins of a plug.

The term "plug" as used herein refers to any moveable connector for electrically connecting to a jack as above. The term "plug" is not defined by the gender of the connector and does not imply having protrusions for fitting into a socket.

It will be noted that although gender based definitions are sometimes used for the terms jacks and plugs, the above definitions are in keeping with IEEE STD 100 and ANSI Y32.16 standards.

BRIEF DESCRIPTION OF THE FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings:

FIGS. 5a-h show eight magnetic configurations for use in a tactile alignment mechanism for a pinless power coupling;

FIG. 11b shows two movable pinless power plugs lying upon the power surface of FIG. 11a;

FIG. 11c shows a power plug provided with two secondary coils for coupling with primary coils of the power surface of FIG. 11a;

DESCRIPTION OF THE PREFERRED EMBODIMENTS

Figure 1:
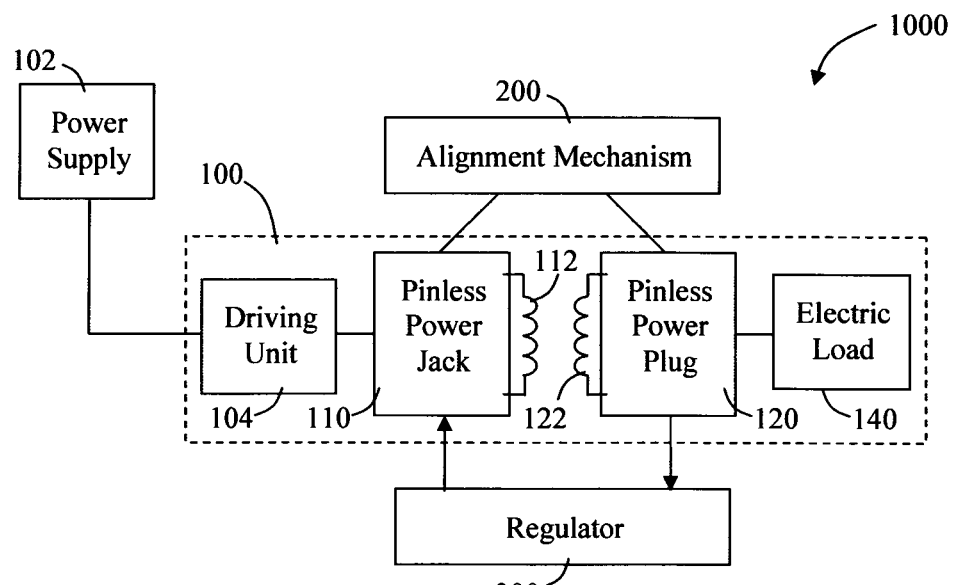
FIG. 1 is a block diagram schematically representing the main features of an inductive power transfer system according to one embodiment of the present invention.

Reference is now made to FIG. 1 which is a 1000 for pinlessly providing power to an electric load 140, according to a first embodiment of the invention. The power transfer system 1000 includes a pinless power coupling 100, an alignment mechanism 200 and a power, regulator 300.

The pinless power coupling 100 comprises a pinless power jack 110 and a pinless power plug 120. The pinless power jack 110 includes a primary inductive coil 112 wired to a power supply 102 via a driving unit 104. The pinless power plug 120 includes a secondary inductive coil 122 which is wired to the electric load 140. When the secondary coil 122 is brought close to the primary coil 112 and a variable voltage is applied to the primary coil 112 by the driving unit 104, power may be transferred between the coils by electromagnetic induction.

The alignment mechanism 200 is provided to facilitate aligning the primary coil 112 with the secondary coil 122 which improves the efficiency of the inductive coupling. The regulator 300 provides a communication channel between the pinless power plug 120 and the pinless power jack 110 which may be used to regulate the power transfer.

The various elements of the pinless power transfer system 1000 may vary significantly between embodiments of the present invention. A selection of exemplary embodiments are described herebelow. These are not to be understood as limiting the scope of the invention in any way.

Pinless Power Coupling

Figure 2A:
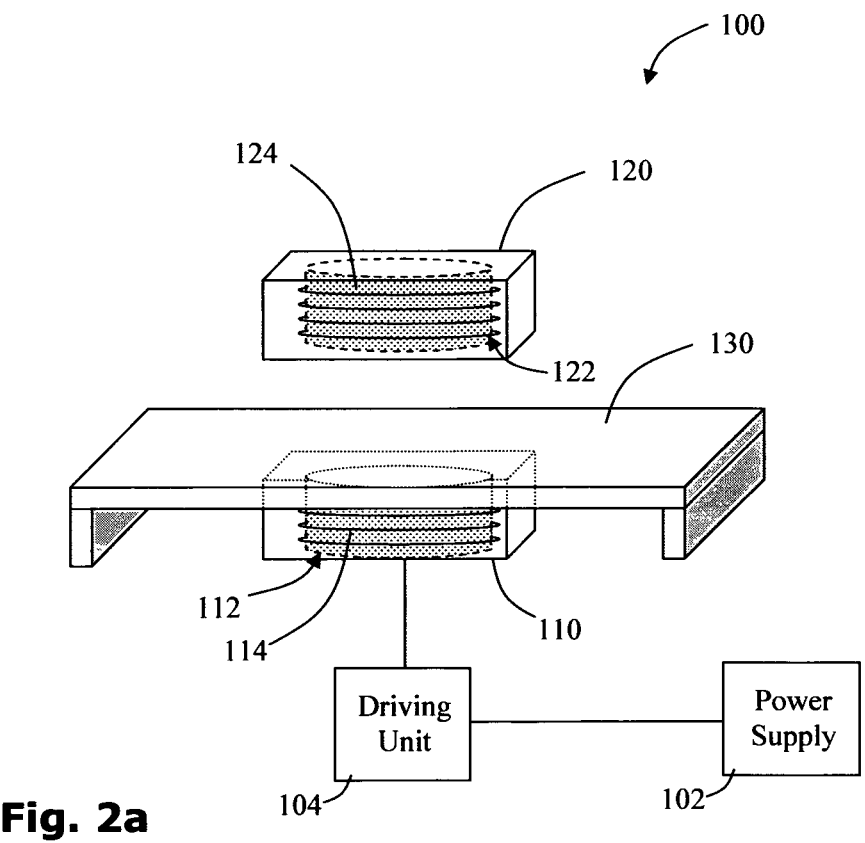
FIG. 2a is a schematic representation of a pinless power coupling consisting of a pinless power jack and a pinless power plug according to another embodiment of the present invention.

Reference is now made to FIG. 2a which shows a pinless power coupling 100 according to a second embodiment of the invention. A pinless power jack 110, which may be incorporated into a substantially flat surface 130 for example, is couplable with a pinless power plug 120. The pinless power jack 110 includes an annular primary coil 112 shielded behind an insulating layer, which may be hardwired to a power source 102 via a driving unit 104. Driving electronics may include a switching unit providing a high frequency oscillating voltage supply, for example.

The pinless power plug 120 includes an annular secondary coil 122 that is configured to inductively couple with the primary coil 112 of the pinless power jack 110 to form a power transferring couple that is essentially a transformer. Optionally, a primary ferromagnetic core 114 is provided in the pinless power jack 110 and a secondary ferromagnetic core 124 is provided in the pinless power plug 120 to improve energy transfer efficiency.

It will be appreciated that known pinned power couplings of the prior art cannot be readily incorporated into flat surfaces. The nature of any pinned coupling is that it requires a socket into which a pin may be inserted so as to ensure power coupling. In contradistinction, the pinless power coupling 100 of the second embodiment of the invention has no pin or socket and may, therefore, be incorporated behind the outer face of a flat surface 130, such as a wall, floor, ceiling, desktop, workbench, kitchen work surface, shelf, door or the like, at a location where it may be convenient to provide power.

It is specifically noted that because the primary coil 112 of the second embodiment is annular in configuration, alignment of the primary coil 112 to the secondary coil 122 is independent of the angular orientation of the pinless power plug 120. This allows the pinless power plug 120 to be coupled to the pinless power jack 110 at any convenient angle to suit the needs of the user and indeed to be rotated whilst in use.

For example, a visual display unit (VDU) may draw its power via a pinless power plug 120 of the second embodiment aligned to a pinless power jack 110 of the second embodiment incorporated into a work desk. Because of the annular configuration of the coils 112, 122, the angle of the VDU may be adjusted without the pinless coupling 100 being broken.

Prior art inductive coupling systems are not easily rotatable. For example, in order to achieve partial rotation, the system described in U.S. Pat. No. 6,803,744, to Sabo, requires the coils to be connected by flexible wires or brushes to concentric commutators on the body of a non-conductive annular container. Even so, Sabo's system allows rotation of only about half the intercoil angle. In contradistinction, the pinless power plug 120 of the second embodiment of the present invention may be rotated through 360 degrees or more, about the central axis of the annular primary coil 110 whilst continually maintaining the power coupling 100.

It is known that inductive energy transfer is improved considerably by the introduction of a ferromagnetic core 114, 124. By optimization of the coupling 100, appropriate electrical loads, such as standard lamps, computers, kitchen appliances and the like may draw power in the range of 10 W-200 W for example.

Figure 2B:
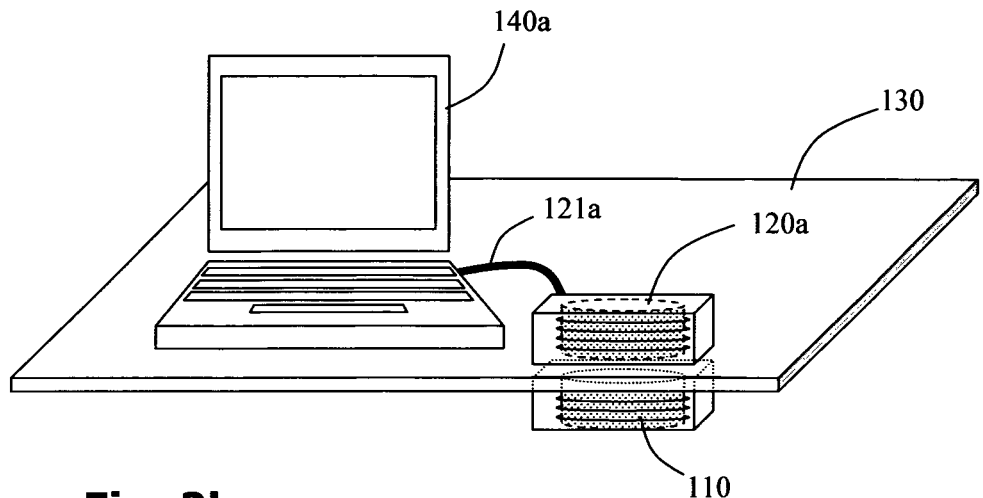
FIGS. 2b-d show three exemplary applications of the power coupling of FIG. 2a providing power to a computer, light bulb and pinless power adaptor.
Figure 2C:
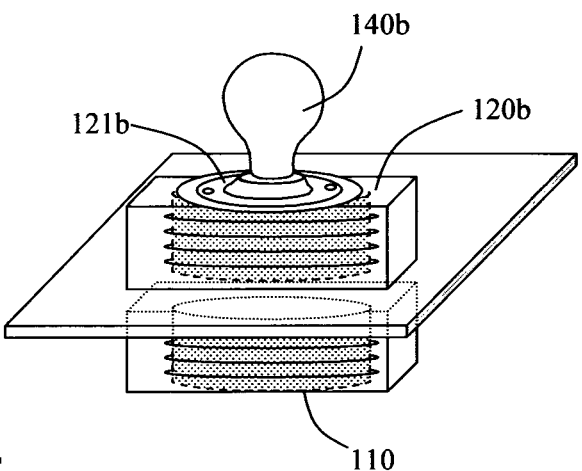
Figure 2D:
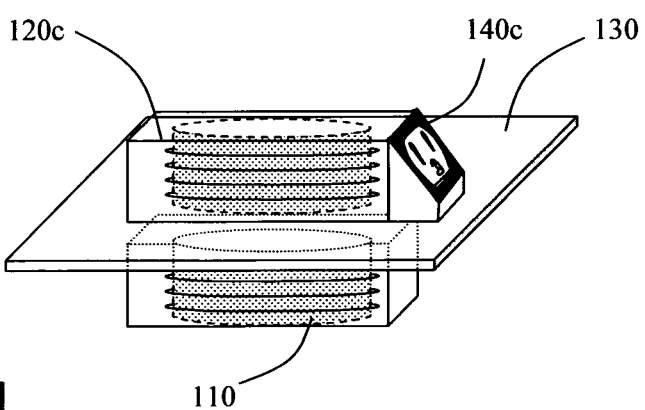

Three exemplary applications of the pinless power jack 110 of FIG. 2a, are illustrated in FIGS. 2b-d, according to various embodiments of the present invention. With reference to FIG. 2b, a computer 140a is shown connected by a power cord 121a to a first pinless power plug 120a. The pinless power plug 120a is inductively coupled to a pinless power jack 110 embedded in a desk top 130. The pinless power plug 120a may thereby draw power from the pinless power jack 110 to power the computer 140a, to charge its onboard power cells or both. The parameters such as charging voltage and current for power provision to computers depends upon the model of the computer and therefore the pinless power plug 120a may be adapted to provide a range of voltages, typically between 5-20V and may transfer power at up to 200 W. Alternatively or additionally, a variety of pinless power jacks and/or pinless power plugs may be provided which transfer various power levels for various appliances.

With reference to FIG. 2c, a light bulb 140b connected to a light socket 121b integral to a second pinless power plug 120b is shown. The pinless power plug 120b may be inductively coupled to a pinless power jack 110 by being aligned therewith, and supplies power directly to the light bulb 140b. It is noted that the voltage and power to be provided by the power plug 120b depends upon the rating of the specific light bulb 140b. The power jack 110 may be configured to provide an appropriate power level and voltage such as 1-12V for flashlight type bulbs or 110V for mains bulbs in North America or 220V for mains bulbs in Europe. Alternatively the secondary coil in the plug 120b may both transmit and step down the voltage.

Referring now to FIG. 2d, a pinless power plug adaptor 120c is shown having a conventional power socket 140c thereupon, into which an electrical load (not shown) may be plugged using a conventional power cable (not shown) with a conventional pinned plug thereupon. The pinless plug adaptor 120c is shown coupled to a power jack 110 embedded into a flat surface 130. It is noted that a pinless power plug adaptor 120c may be coupled with a pinless jack 110 thereby allowing electrical power to be supplied to conventional electrical devices having pinned plugs. The pinless power plug adaptor 120c is typically configured to provide a mains voltage signal of 110V AC in North America or 220V AC in Europe although other voltages, including DC voltages via an internal rectifier may be provided where required.

The induction coils 112, 122 for use in the pinless power coupling 100 may be made of coiled wires or they may be manufactured by a variety of techniques such as screen printing, or etching for example.

Figure 3A:
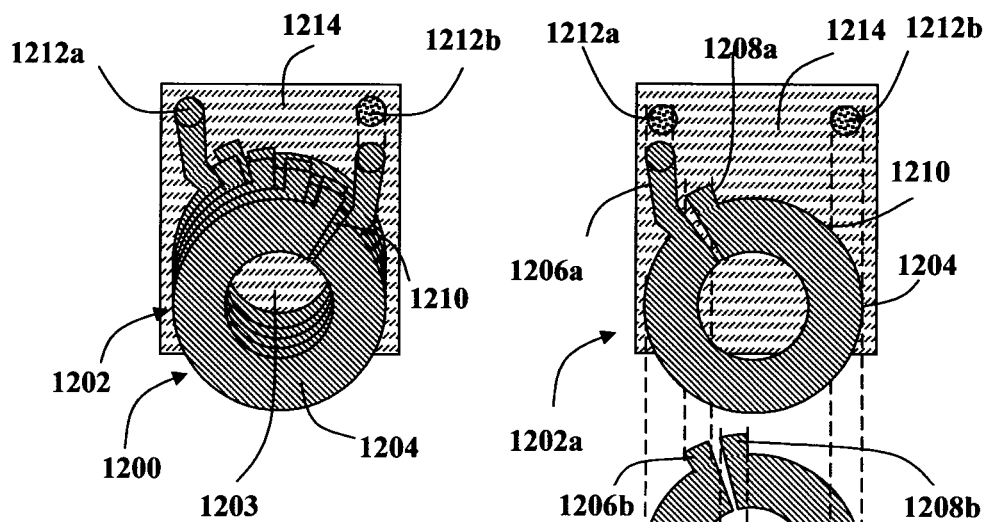
FIGS. 3a and 3b show an exemplary configuration for an induction coil in schematic and exploded representation respectively.
Figure 3B:
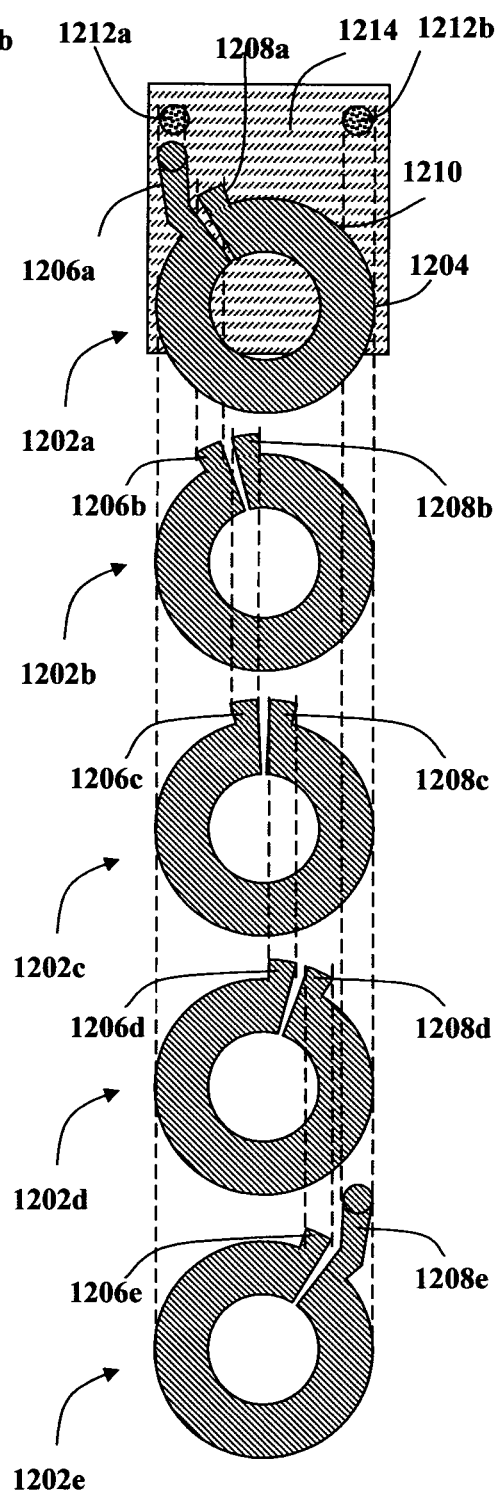

FIGS. 3a and 3b schematically represent an exemplary induction coil 1200, according to a third embodiment of the invention in schematic and exploded views respectively. The induction coil 1200 is annular in form and is suitable for use as a primary coil 112 in a pinless power jack 110 or for use as a secondary coil 122 in a pinless power plug 120. The coil is noted to provide a particularly good coupling for its overall size. An induction coil 1200 is formed by stacking a plurality of conducting rings 1202a-e upon a base board 1214. The induction coil 1200 is in contact with two point contacts 1212a, 1212b upon the base board 1214. Each conducting ring 1202 has a leading protruding contact 1208 and a trailing protruding contact 1206 which protrude radially from the center of a split ring 1204 and are located on either side of insulating gap 1210.

The conducting rings 1202a-e are stacked in such a manner that each ring is insulated from the rings adjacent to it. The insulating gaps 1210 in the conducting rings 1202 are configured such that the leading protruding contact 1208a of a first ring 1202a makes contact with the trailing protruding contact 1206b of a second ring 1202b. In turn the leading protruding contact 1208b of the second ring 1202b makes contact with the trailing protruding contact 1206c of a third ring 1402c and so forth until all the rings 1202a-e stack together to form an induction coil 1200. The leading protruding contact of the final ring 1208e and the trailing protruding contact of the first ring 1206a are extended to form electrical contact with contact points 1212a, 1212b upon the base board 1214. It will be appreciated that this configuration produces an annular induction coil 1200 with a free central axis 1203 which may accommodate inter alia a ferrite core, a magnetic alignment mechanism (see below) and/or an optical signal transfer system (see below).

The individual rings 1202a-e may be manufactured by a variety of techniques such as by circuit sandwiching, circuit printing, fabrication printing, circuit etching, stamping and the like. Although the induction coil 1200 of the third embodiment shown in FIGS. 3a and 3b consists of a mere five rings 1202a-e, it will be appreciated that the number of rings that may be stacked to form induction coils in this manner may vary considerably, as may their dimensions. Thus induction coils with the desired properties may be formed.

Alignment Mechanisms

The efficiency of the power coupling 100, depends upon the alignment between the secondary coil 122 of the pinless power plug 120 and the primary coil 112 of the pinless power jack 110. Where the substantially flat surface 130 is fabricated from transparent material such as glass or an amorphous plastic, such as PMMA for example, the user is able to see the pinless power plug 110 directly and may thus align the pinless plug 120 to the pinless jack 110 by direct visual observation. However, where the substantially flat surface 130 is opaque alternative alignment mechanisms 200 may be necessary. Such alignment mechanisms 200 may include tactile, visual and/or audible indications, for example.

Tactile Alignment Mechanisms

Figure 4A:
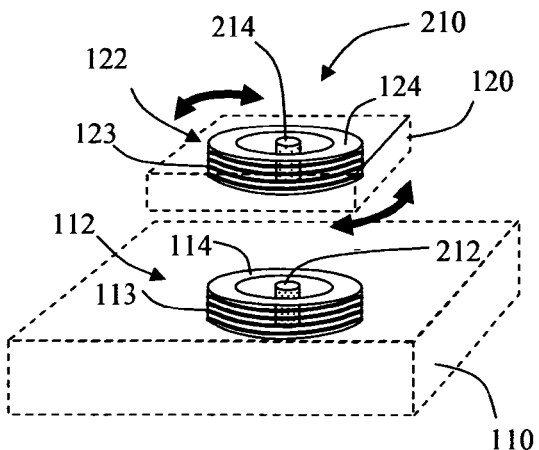
FIGS. 4a-c show three exemplary tactile alignment mechanisms for aligning a pinless power plug to a pinless power jack according to further embodiments of the invention.
Figure 4B:
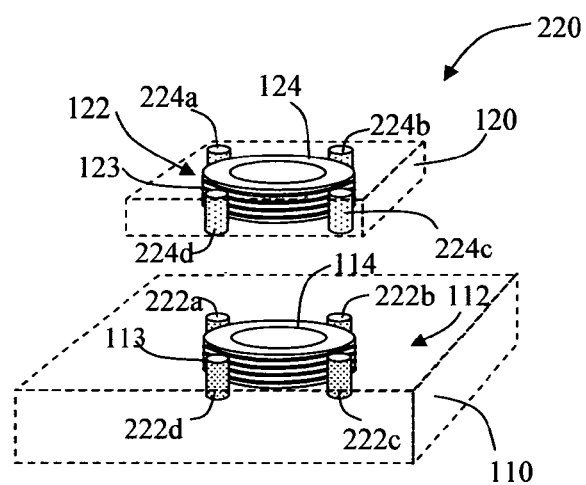
Figure 4C:
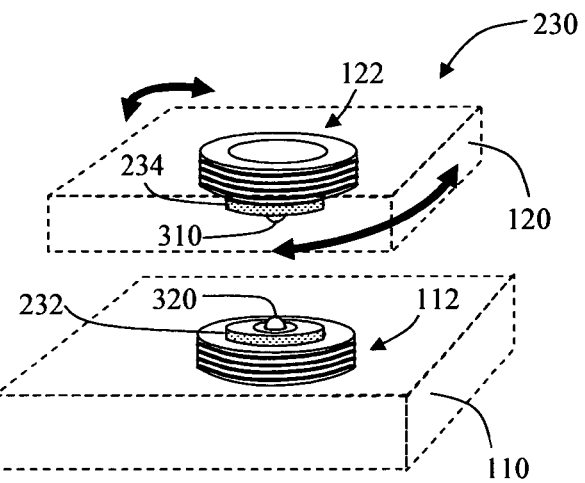

With reference now to FIGS. 4a-c, three exemplary tactile alignment mechanisms 210, 220, 230 are shown according to various embodiments of the invention. Referring particularly to FIG. 4a, a first tactile alignment mechanism 210 is shown wherein the pinless power jack 110 includes a central magnetic snag 212 surrounded by an annular primary coil 112 and the corresponding pinless power plug 120 includes a central magnetic anchor 214 surrounded by an annular secondary coil 122.

The primary coil 112 of this embodiment consists of a primary conducting wire 113, preferably a litz wire which is wound around a primary ferromagnetic core 114 and the secondary coil 122 consists of a secondary conducting wire 123, again preferably a litz wire which is wound around a secondary ferromagnetic core 124. When aligned, the primary ferromagnetic core 114 and the secondary ferromagnetic core 124 form a magnetic couple that increases the magnetic flux linkage between the primary coil 112 and the secondary coil 122, allowing electrical energy to be transmitted more efficiently therebetween.

The central magnetic snag 212 is configured to engage with the magnetic anchor 214 carried by the pinless power plug 120, when the secondary coil 122 is optimally aligned to the primary coil 112 of the pinless power jack 110. It will be appreciated that the attraction between the magnetic anchor 214 and the magnetic snag 212 may be felt by an operator, thereby providing a tactile indication of alignment. In addition, the anchor-snag arrangement, once engaged, also serves to lock the pinless power plug 120 into alignment with the pinless power jack 110. The combination of a central circular magnetic snag 212 and a concentric annular primary coil 112, allows the plug 120, having a central magnetic anchor 214, to rotate around a central axis without losing alignment and thus to be aligned at any orientation.

A second tactile alignment mechanism 220 is shown in FIG. 4b wherein pinless power jack 110 includes four magnetic corner snags 222a-d which are arranged at four points around primary coil 112, being a primary conducting wire 113 wound around a primary ferromagnetic core 114. The four magnetic corner snags 222a-d are configured to magnetically couple with four magnetic corner anchors 224a-d carried by a pinless power plug 120, when the primary coil 112 and secondary coil 122 are aligned.

In embodiments where rotation of the secondary coil 122 may impede energy transfer or is otherwise undesirable, multiple magnetic snags 222 may be used to limit the rotation of the plug 120 about its central axis to four specific alignment angles. At each of the compass points, the secondary ferromagnetic core 124 is orientated and aligned to the primary ferromagnetic core 114. The primary ferromagnetic core 114 and the secondary ferromagnetic core 124 thus provided, form a magnetic couple that increases the magnetic flux linkage between the primary coil 112 and the secondary coil 122, allowing electrical energy to be transmitted more efficiently therebetween. It will be appreciated that the number and configuration of multiple magnetic snags 222 and magnetic anchors 224 may be selected to provide various multiple discrete alignment angles.

With reference to FIG. 4c, a third tactile alignment mechanism 230 is shown, wherein the pinless power jack 110 includes an annular magnetic snag 232 concentric with a primary coil 112. The annular magnetic snag 232 is configured to engage with an annular magnetic anchor 234 concentric with a secondary coil 122 in a pinless plug 120. The annular configuration provides a free central axis which may be used to accommodate an optical transmitter 310 and an optical receiver 320 of an optical signal system for the regulation of power transfer. The third tactile alignment mechanism 230 allows the plug 120 to rotate around its central axis without compromising the alignment between the primary coil 112 and the secondary coil 122, or between the optical transmitter 310 and the optical receiver 320 of the optical signal system. The power plug 120 may thus to be orientated at any angle to suit requirements.

For magnetic coupling, it will be appreciated that a permanent or electro magnet in the jack may exert an attractive force on a second permanent or electromagnet in the plug. Alternatively, the plug may be fitted with a piece of ferrous material that is attracted to a magnet but is not itself, magnetic. Furthermore, the jack may include a piece of iron that is attracted to a magnet, and the plug may be provided with a permanent or with an electromagnet. By way of illustration of this, with reference to FIGS. 5a-h, eight alternative magnetic alignment mechanisms for use in coupling a pinless power plug 120 with a pinless power jack 110 are shown. A permanent magnetic snag 241 may couple with any of a permanent magnetic anchor 244, an electromagnetic anchor 245 or a ferromagnetic element 246. An electromagnetic snag 242 may couple with any of a permanent magnetic anchor 244, an electromagnetic anchor 245 or a ferromagnetic element 246.

A ferromagnetic snag 243 may couple with a permanent magnetic anchor 244, or an electromagnetic anchor 245.

It is noted that a primary ferromagnetic core 114 of a pinless power jack 110 may itself serve as a ferromagnetic snag 243. Alternatively, the primary coil 112 may serve as an electromagnetic snag 242. It is further noted that a secondary ferromagnetic core 124 of a pinless power plug 120 may serve as a ferromagnetic anchor 246. Alternatively, the secondary coil 122 may serve as an electromagnetic anchor 245.

A preferred magnetic alignment configuration is shown in FIG. 5a illustrating a permanent magnetic snag 241 configured to couple with a permanent magnetic anchor 244. The orientations of the magnetic snag 241 and the magnetic anchor 244 are such that facing ends have opposite polarity so that they are mutually attractive. It is noted that in certain embodiments two distinct types of pinless power jacks 120 are provided for coupling with two distinct types of pinless power plugs, for example, a high power coupling and a low power coupling. In such embodiments it is important to avoid a low power plug being aligned with a high power jack, for example. The magnetic anchors may prevent incorrect coupling by using opposite polarities for each type of coupling. Thus, the low power plug may have North seeking polar magnetic anchor, say, to engage with a South seeking polar magnetic snag on the low power jack and the high power plug may have a South seeking polar magnetic anchor to engage with a North seeking polar magnetic snag on the high power jack. If the low power plug of this embodiment is placed proximate to the high power jack the North seeking polar anchor repels the North seeking polar snag and the couple can not be aligned.

It will be appreciated that, apart from magnetic mechanisms, other anchor-and-snag type tactile alignment means may alternatively be used such as suckers, hook-and-loop arrangements, ridge-and-groove arrangements and the like. Likewise these may be designed to selectively couple with only a selection of different power jacks in a common surface.

Visual Alignment Mechanisms

Figure 6A:
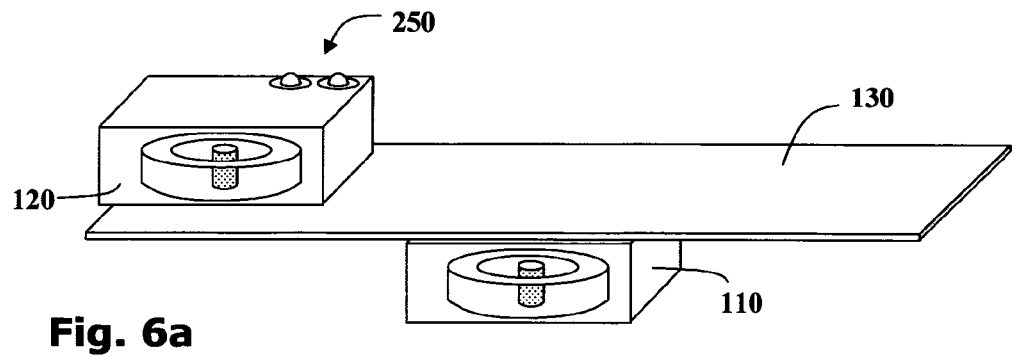
FIGS. 6a-e show three exemplary plug-mounted visual alignment mechanisms for a pinless power coupling.
Figure 6B:
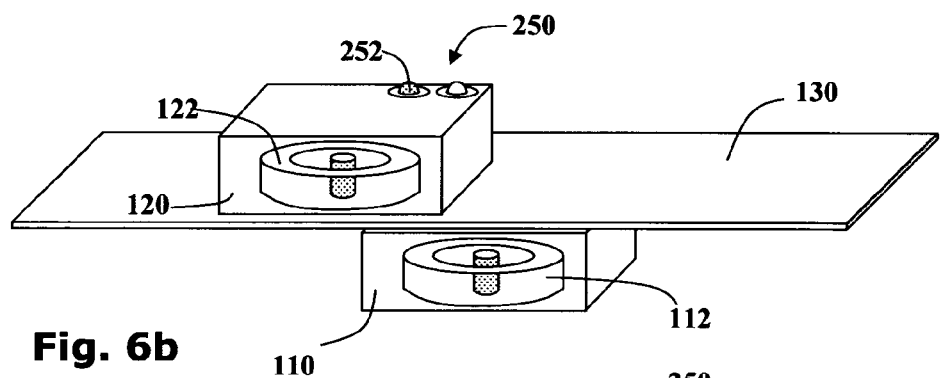
Figure 6C:
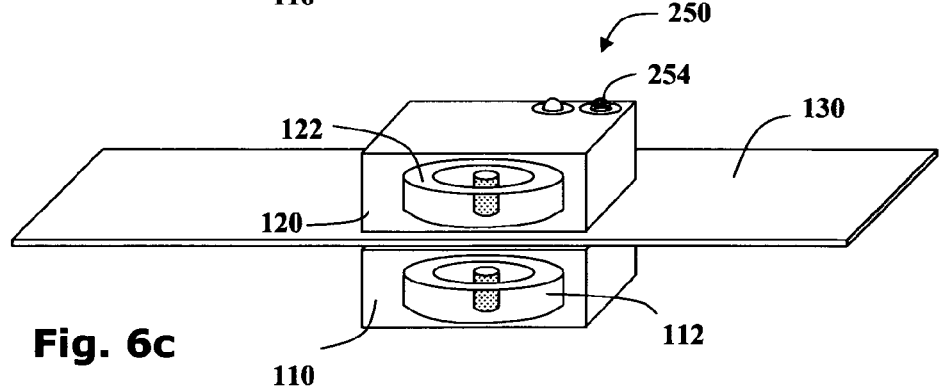

With reference to FIGS. 6a-e exemplary visual alignment mechanisms for a pinless power plug 120 are shown. FIGS. 6a-c show a pinless power plug 120 having a first visual indicator 250 consisting of two indicator LEDs: a rough alignment indicating orange LED 252 and fine alignment indicating green LED 254. A pinless power jack 110 is concealed beneath an opaque surface 130. FIG. 6a shows the pinless power plug 120 at a large distance from the pinless power jack 110 with neither of the two indicator LEDS being activated. FIG. 6b shows the pinless power plug 120 partially aligned with the pinless power jack 110 and the orange indicator LED 252 being lit up. This alerts a user that the plug 120 is in proximity with a pinless power jack 110, but is not properly aligned therewith. Referring to FIG. 6c, when the pinless power plug 120 is optimally aligned with the pinless power jack 110, the green indicator LED 254 is activated to signal to a user that the plug 120 and (concealed) jack 110 are properly aligned and optimal power transfer is possible.

Figure 6D:
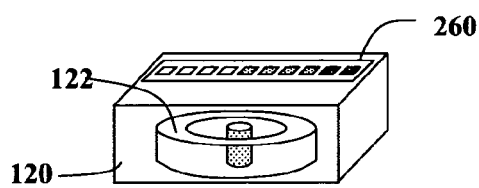
Figure 6E:
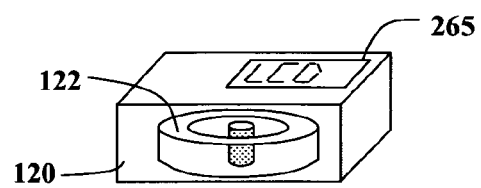

FIG. 6d shows a second visual indicator consisting of a plurality of LEDs in a strip 260; it being appreciated that a larger number of LEDs provides for a greater degree of graduation in indication of proximity, and helps the user home in on the concealed jack. With reference to FIG. 6e, showing a third visual indicator, instead of or in addition to LEDs, an LCD display 265 may provide an alternative visual indicator, which can, in addition to providing indication of the degree of alignment, also provide indication of the current drawn by the load coupled to the plug, for example.

By their nature, LEDs are either illuminated or not illuminated, however Proximity data may be encoded by flashing, frequency or the like. The intensity of power supplied to other types of indicator lamps may be used to indicate the degree of coupling, or a flashing indicator lamp may be provided, such that the frequency of flashing is indicative of degree of alignment. Indeed, where the load is an incandescent light source or the like, it may be used directly for alignment purposes, since poor alignment results in a noticeable dimming affect.

Figure 7A:
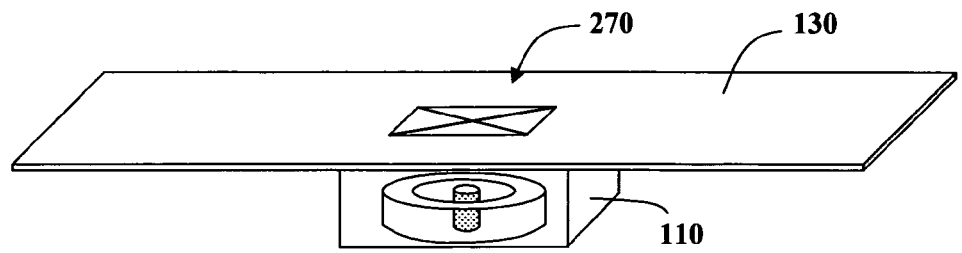
FIGS. 7a-d show four exemplary surface-mounted visual alignment mechanisms for a pinless power coupling.
Figure 7B:
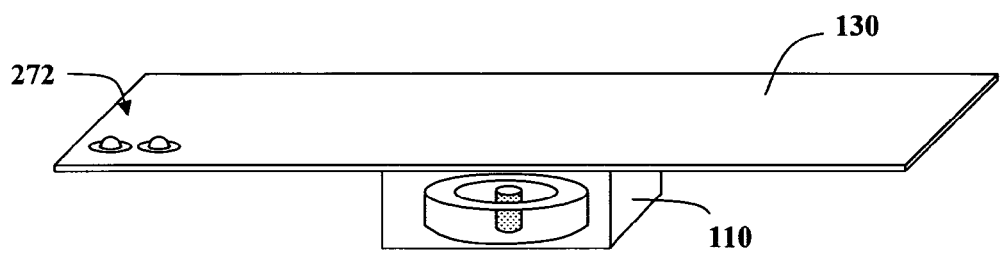
Figure 7C:
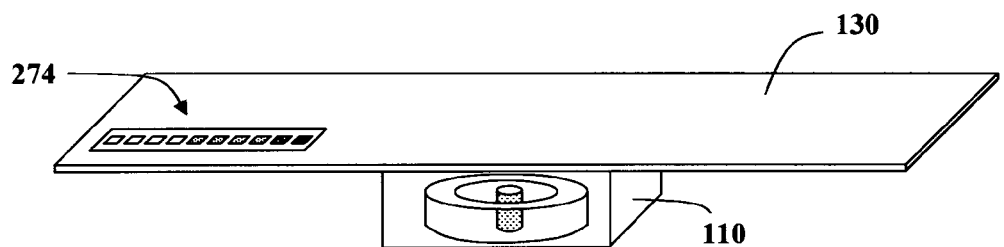
Figure 7D:
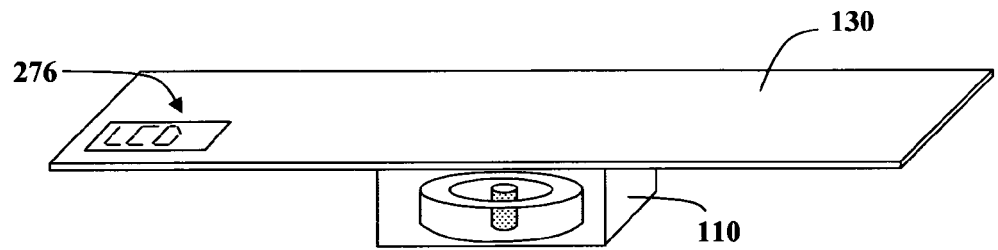

Additionally or alternatively to plug-mounted visual indicators for jack-plug alignment surface-mounted visual indicators may be provided. Thus, with reference to FIGS. 7a-d, various exemplary visual alignment mechanisms are shown located upon a flat surface 130 in which a pinless power jack 110 has been embedded. In FIG. 7a, showing a fourth visual indicator, a mark 270 has been made on the flat surface 130 directly above the concealed pinless power jack 110. This enables the user to physically align the plug with the mark 270 and thus with the concealed jack FIG. 7b shows a fifth visual indicator 272 consisting of two indicator LEDs embedded in the surface 130. This works as per the embodiment of FIGS. 6b and 6c, mutatis mutandis, to provide a graduated indication of alignment. Similarly, FIG. 7c shows a sixth visual indicator 274 consisting of a plurality of LEDs in a strip embedded in the surface 130 for a more graduated degree of alignment indication and FIG. 7d shows a seventh visual indicator 276 consisting of an LCD display embedded in the surface 130.

Audible Alignment Mechanisms

Figure 8A:
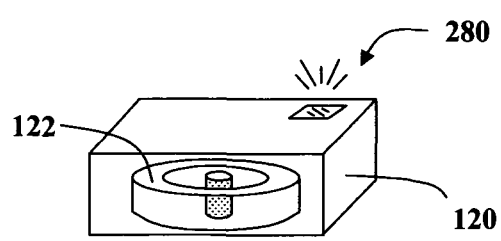
FIGS. 8a and 8b show audible alignment means for use with the pinless power coupling according to still further embodiments of the invention.
Figure 8B:
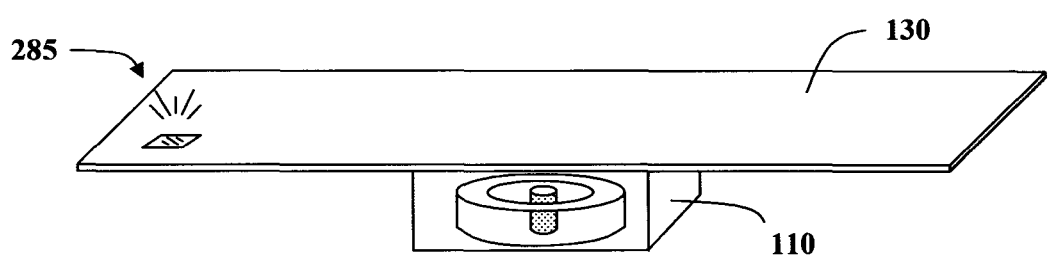

Non-visual alignment means may alternatively or additionally be provided for example, an audible signal may assist the visually impaired attain alignment. As shown in FIG. 8a, a pinless power plug 120 may include a buzzer 280. The buzzer 280 may be configured to provide graduated indication of proximity to alignment for example by variation in tone, pitch, volume, timbre, beep frequency or the like. Alternatively an audible alignment means may be surface-mounted as shown in FIG. 8b, showing a buzzer 285 embedded in the surface 130, configured to buzz in a manner indicating whether there is, and extent of alignment.

Power Regulation

Efficient power transfer requires regulation. In order to regulate the characteristics of the power provided to the secondary coil 122, such as voltage, current, temperature and the like, feedback from the device to the power jack 110 is desirable. According to further embodiments of the present invention, a power regulator 300 provides a communications channel between the power plug 120 wired to the load and the power jack 110.

Figure 9:
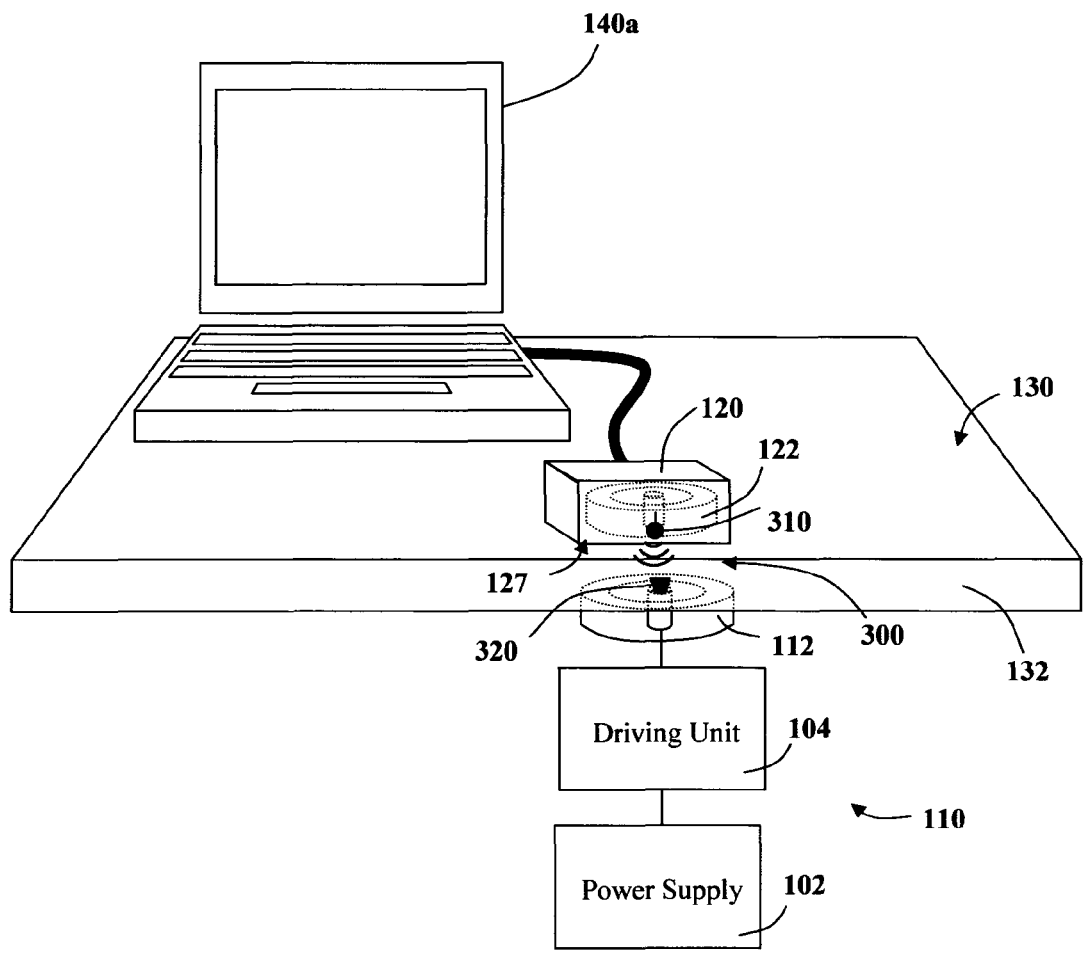
FIG. 9 shows an exemplary optical transmitter for regulating power transfer to a computer via a pinless power coupling.

A first exemplary power regulator 300 is illustrated in FIG. 9. An optical transmitter 310, such as a light emitting diode (LED), may be incorporated within the pinless power plug 120 and operably configured to transmit electromagnetic radiation of a type and intensity capable of penetrating both the casing 127 of the pinless power plug 120, and a shielding layer 132 of the substantially flat surface 130. An optical receiver 320, such as a photodiode, a phototransistor, a light dependent resistors or the like, is incorporated within the pinless power jack 110 for receiving the electromagnetic radiation transmitted through the surface layer 132. In preferred embodiments the optical transmitter 310 and the optical receiver 320 are configured along the axis of the annular primary coil 112. This permits alignment to be maintained through 360 degree rotation of the pinless power plug 120.

It is noted that many materials are partially translucent to infra-red light. It has been found that relatively low intensity infra red signals from LEDs and the like, penetrate several hundred microns of common materials such as plastic, cardboard, Formica or paper sheet, to a sufficient degree that an optical receiver 320, such as a photodiode, a phototransistor, a light dependent resistor or the like, behind a sheet of from 0.1 mm to 2 mm of such materials, can receive and process the signal. For example a signal from an Avago HSDL-4420 LED transmitting at 850 nm over 24 degrees, may be detected by an Everlight PD15-22C-TR8 NPN photodiode, from behind a 0.8 mm Formica sheet. For signaling purposes, a high degree of attenuation may be tolerated, and penetration of only a small fraction, say 0.1% of the transmitted signal intensity may be sufficient. Thus an infra-red signal may be used to provide a communication channel between primary and secondary units galvanically isolated from each other by a few hundred microns of common sheet materials such as wood, plastic, Formica, wood veneer, glass etc.

Where the intermediate surface layer is opaque to infrared, particularly where the intermediate surface layer is relatively thick, an optical path may be provided to guide the signal to the optical receiver 320. Typically, the optical path is a waveguide such as an optical fiber, alternatively, the optical receiver 320 may be placed behind an opening in the face of the surface and covered with a translucent window.

In inductive couples, the communication channel may be used to transfer data between the primary and the secondary coils. The data transferred may be used to regulate the power transfer, for example. Typically the signal carries encoded data pertaining to one or more items of the list below:
the presence of the electric load;
the required operating voltage for the electric load;
the required operating current for the electric load;
the required operating temperature for the electric load;
the measured operating voltage for the electric load;
the measured operating current for the electric load;
the measured operating temperature for the electric load, or
a user identification code.

Such a signal may be useful in various inductive energy couples usable with the present invention such as transformers, DC-to-DC converters, AC-to-DC converters, AC-to-AC converters, flyback transformers, flyback converters, full-bridge converters, half-bridge converters and forward converters.

Figure 10:
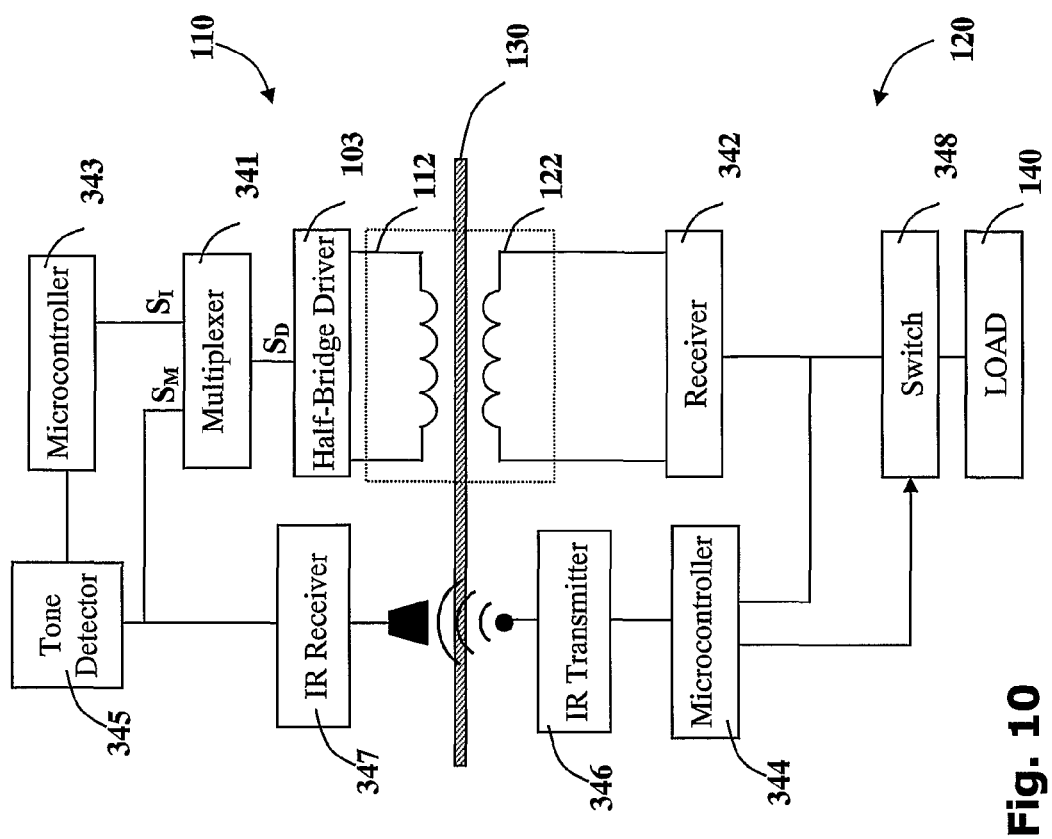
FIG. 10 is a block diagram illustrating the main features of an exemplary signal transfer system for initiating and regulating inductive power transfer from the pinless power plug.

Referring now to FIG. 10, a block diagram is presented illustrating the main features of an exemplary signal transfer system for initiating and regulating inductive power transfer according a second embodiment of the power regulator 300. An inductive power outlet, such as a pinless power jack 110, is configured to couple with a secondary unit, such as a pinless power plug 120, separated therefrom by a surface layer 130. Power is transferred to an electric load 140 wired to the pinless power plug 120.

The pinless power jack 110 includes a primary inductive coil 112, a half-bridge driver 103, a multiplexer 341, a primary microcontroller 343, a tone detector 345 and an optical receiver 347. The secondary unit, such as pinless power plug 120, consists of a secondary coil 122, a receiver 342, a secondary microcontroller 344, an optical transmitter 346 and a load connecting switch 348.

The primary inductive coil 112 of the inductive power outlet is driven by the half-bridge driver 103 which receives a driving signal $S_D$ from the multiplexer 341. The multiplexer 341 selects between an initialization signal $S_I$ or a modulation signal $S_M$. The initialization signal $S_I$ provides a detection means for activating the inductive power outlet 110 when a secondary unit 120 is present. Once active, the modulation signal $S_M$ provides a means for regulating power transfer from the power outlet 110 to the secondary unit 120.

Secondary unit detection is provided by the primary microcontroller 343 intermittently sending an initialization signal $S_I$ to the multiplexer 341 when the power outlet 110 is inactive. The multiplexer 341 relays the initialization signal $S_I$ to the half-bridge driver 103, which results in a low powered detection pulse being transmitted by the primary coil 112. If a secondary unit 120 is aligned with the inductive power outlet 110, the low powered detection pulse is inductively transferred to the secondary coil 122 across the surface layer 130. The receiver 342 is configured to receive this detection pulse and relay a detection signal to the secondary microcontroller 344 which sends a signal to the load connector switch 348 to connect the load and triggers the optical transmitter 346 to transmit an optical signal through the surface layer 130 confirming that the secondary unit 120 is in place. The optical signal is received by the optical receiver 347 in the power outlet 110, and is then relayed to the tone detector 345 which sends a confirmation signal to the primary microcontroller 343. The primary microcontroller 343 then activates the power outlet 110 by triggering the multiplexer 341 to select the modulation signal $S_M$ to regulate the power transfer.

The modulation signal $S_M$ comes directly from the optical receiver 347 and is used to regulate the duty cycle of the half-bridge driver 103. Power transferred to the secondary unit 120 is monitored by the secondary microcontroller 344. The secondary microcontroller 344 generates a modulation signal $S_M$ and sends it to the optical transmitter 346, which transmits a digital optical signal. The modulation signal $S_M$ is thus received by the optical detector 347 of the primary unit 110, relayed to the multiplexer 341 and used to regulate the half-bridge driver 103.

Prior art inductive power transfer systems control and regulate power from the primary unit 110. In contradistinction, it is a feature of this second embodiment of the power regulator that the power transfer is initiated and regulated by a digital signal sent from the secondary unit 120. One advantage of this embodiment of the invention is that the regulation signal is determined by the secondary microcontroller 344 within the pinless power plug 120, which is hard wired to the load. Therefore conductive communication channels to the secondary microcontroller 344 may be used to transmit analogue signals to the secondary microcontroller 344 for monitoring the power transfer and a digital signal may be used for communicating between the pinless power plug 120 and the pinless power jack 110.

Multicoil Systems

Alignment of a pinless power plug to a pinless power jack may be facilitated by using a plurality of induction coil and thereby increasing the number of alignment locations.

Figure 11A:
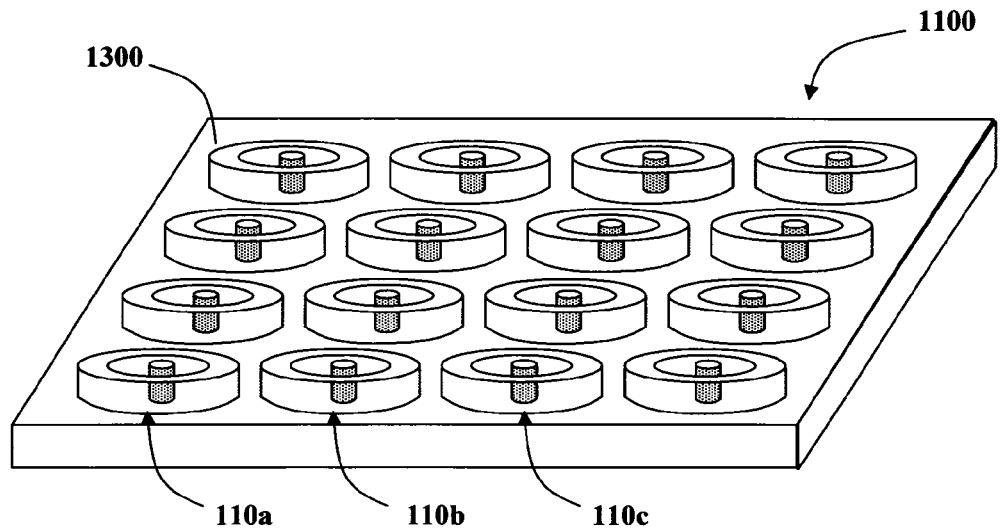
FIG. 11a shows a power surface including an array of pinless power jacks in accordance with yet another embodiment of the invention.

A plurality of pinless power jacks 110a-n are shown in FIG. 11a arranged into a power array 1100 covering an extended surface 1300 according to still a further embodiment of the invention. The power array 1100 allows for a pinless power plug 120 to be aligned with a power jack 110 in a plurality of locations over the surface 1300. It is noted that although a rectangular arrangement is represented in FIG. 11a, other configurations such as a hexagonal close packed arrangement, for example, may be preferred. Optionally multiple layers of overlapping power jacks 110 may be provided. Since a power plug may be placed in alignment with any of the power jacks 110a-n, a power supplying surface may be provided which can provide power to a plug 120 placed at almost any location thereupon, or even to a plug in motion over the power array 1100.

Figure 11B:
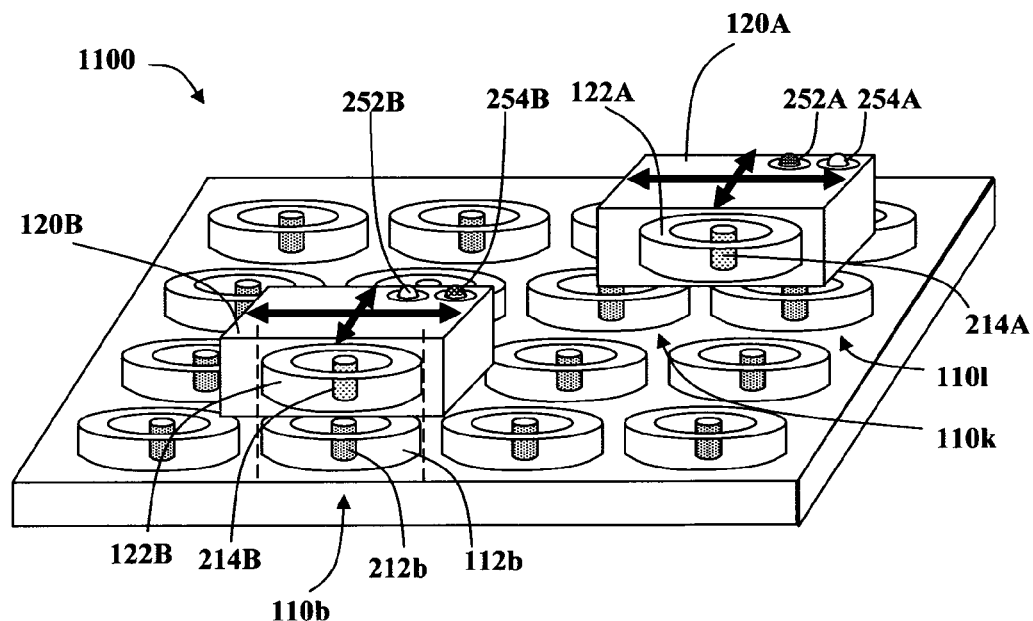

With reference to FIG. 11b, two pinless power plugs 120A, 120B are shown lying upon a single power array 1100 including a plurality of embedded jacks. The plugs 120A, 120B are free to move parallel to the surface 1300 as indicated by the arrows. As a plug 120, moving along the power array 1100, approaches a jack 110, an anchor 214 associated with the 120 couples with a snag 212 associated with a jack 110 so bringing the primary coil 112 into alignment with a secondary coil 122.

When a power plug 120A lies between two jacks 110k, 1101, its anchor 214a is not engaged by any snag 212. Consequently, the secondary coil 122A of the power plug 120A is not aligned with any primary coil 112. In such a situation an orange LED indicator 252A for example, may be used to indicate to the user that the plug 120A is close to but not optimally aligned with a primary coil 112. Where a power plug 120B lies directly in line with power jack 110b such that its anchor 214B is engaged by a snag 212b embedded in the power jack 110b, the secondary coil 122B is optimally aligned to the primary coil 112b of the jack 110b and this may be indicated for example by a green LED indicator 254B.

Figure 11C:
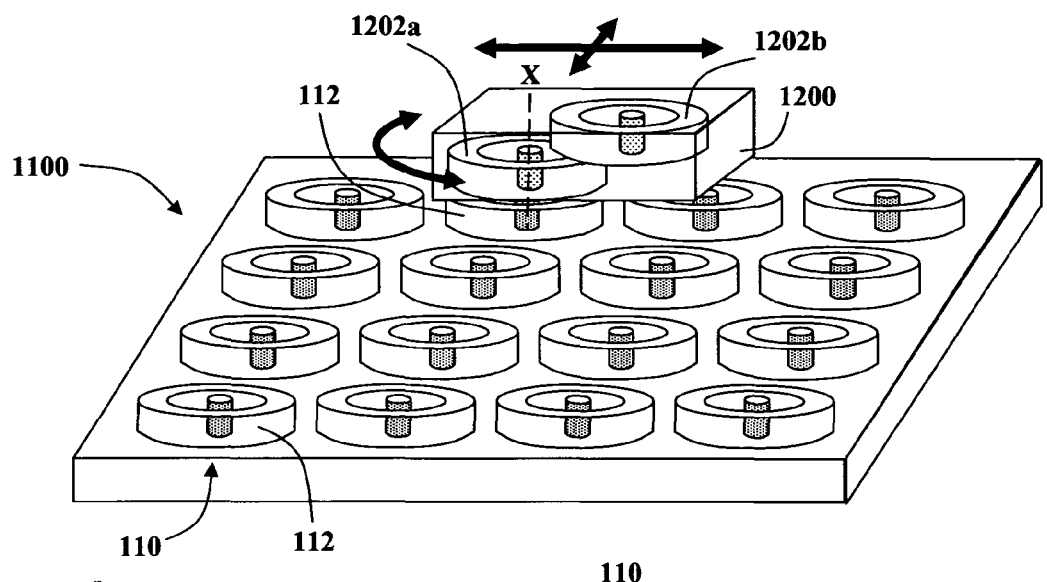

Reference is now made to FIG. 11c showing a power plug 1200 provided with multiple secondary coils 1202a, 1202b according to another embodiment of the invention. Efficient inductive power transfer may occur when either one of the power plug's secondary coils 1202 is aligned to any primary coil 112. It is noted that known multicoiled power plugs such as the double coiled plug described in U.S. Pat. No. 6,803,744, to Sabo, need to be specifically and non-rotatably aligned such that the two secondary coils are both coupled to primary coils simultaneously. In contradistinction to the prior art, in the multicoiled power plug 1200 of the present embodiment of the invention, only one secondary coil 1202 aligns with one primary coil 110 at a time. Alignment may thereby be achieved at any angle and the multicoiled power plug 1200 may be rotated through 360 degrees or more about the axis X of the primary coil 110.

Furthermore, in the multicoiled power plug 1200, the distance between the secondary coils 1202 may advantageously be selected to differ from the inter-coil spacing of the power platform array 1100. The multicoil power plug 1200 may then be moved laterally over the power surface 1100 and the driving unit of the power array 1100 may activate the primary coils located closest to the multicoil power plug 1200. As the multicoil power plug 1200 is moved laterally, the secondary coils 1202a, 1202b both receive power from the primary coils in their vicinity. The power transferred to both the secondary coils 1202a, 1202b undergoes diode summation to produce a total voltage output. Because the two secondary coils 1202a, 1202b are never both aligned simultaneously, the total output voltage is smoothed and power fluctuations normally associated with power transfer to moving power plugs may be prevented. This increases overall efficiency and reduces the need for large variations in the power provided to the power array 1100.

Inductive power transfer models have been simulated to measure the efficiency of power transfer to multiple secondary coils from a power surface with inter coil separation of 8.8 cm. With voltage applied only to the primary coil closest to a pair of secondary coils separated by 4.4 cm (half the surface intercoil separation), the efficiency of total energy transferred to the pair of secondary coils does not fall below 80% as the pair of secondary coils undergoes lateral translation along the surface. This efficiency is further improved by increasing the number of secondary coils, for example in simulations of a triplet of secondary coils spaced at 2.9 cm from each other, efficiencies of 90% were achieved.

In other embodiments of the invention where a multilayered power surface is provided, each layer of primary coil arrays is offset from the others, for example by half the surface intercoil separation. A single coiled pinless power plug may be placed upon the multilayered power surface and the driving unit of the power surface configured to activate only the primary coils within the multilayered power surface located closest to alignment with the secondary coil of the power plug regardless of its layer. In this way, the voltage, efficiency and power transferred to the receiving coil are greatly stabilized.

Power arrays 1100 may be incorporated within any flat surface 1300 where it is convenient to provide power. Such surfaces include walls, floor areas, ceilings, desktops, workbenches, kitchen work surfaces and counter tops, shelves, doors and door panels and the like.

Figure 12A:
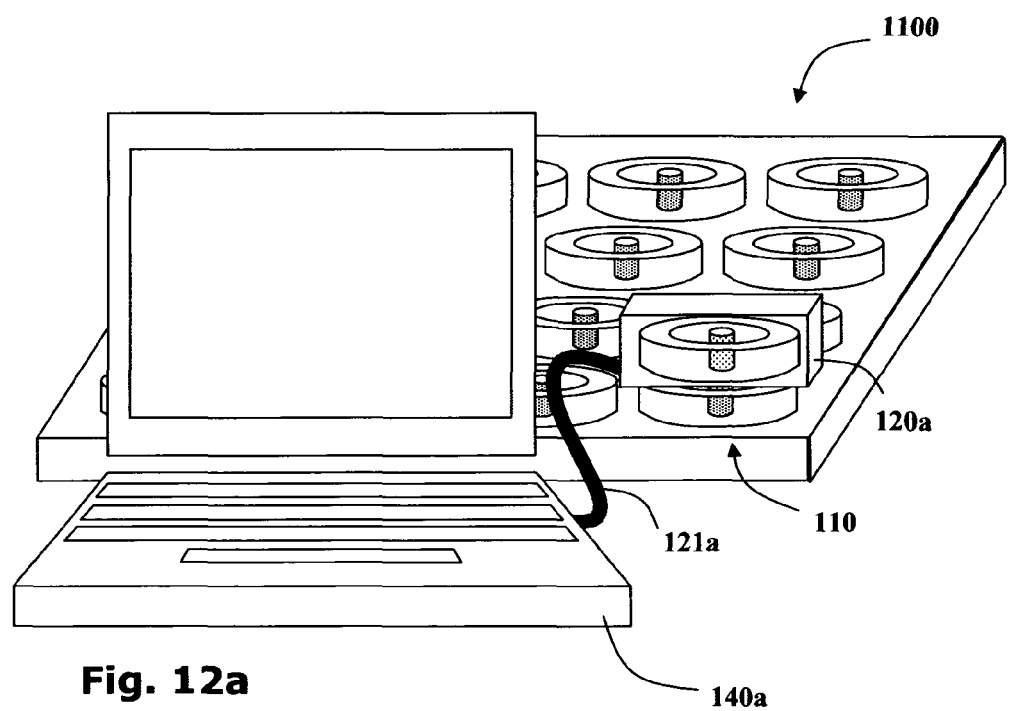
FIGS. 12a-c show three exemplary applications of the power surface of FIG. 11a providing power to a computer, light bulbs and pinless power adaptors respectively.

For example, FIG. 12a shows an exemplary horizontal power array 1100 and a pinless power plug 120a electrically coupled to a computer 140a by means of a connecting cable 121a. The pinless power plug 120a is placed upon the power array 1100 and is inductively coupled to a pinless power jack 110 therewithin. Power supplied to the computer 140a may power the computer 140a directly and/or recharge a rechargeable power cell thereof. The arrangement of FIG. 12a with pinless power plugs 120a connected by cables 121a, typically reduces the length and number of wires and cables 121a necessary when connecting a computer 140a to a power source, and thus may be beneficial in conference rooms and the like, where such wires are obstructing, unsightly and generally inconvenient. It is noted that the pinless power plug 120a may alternatively be integral to the computer 140a, and the connecting cable 121a thereby dispensed with altogether.

Figure 12B:
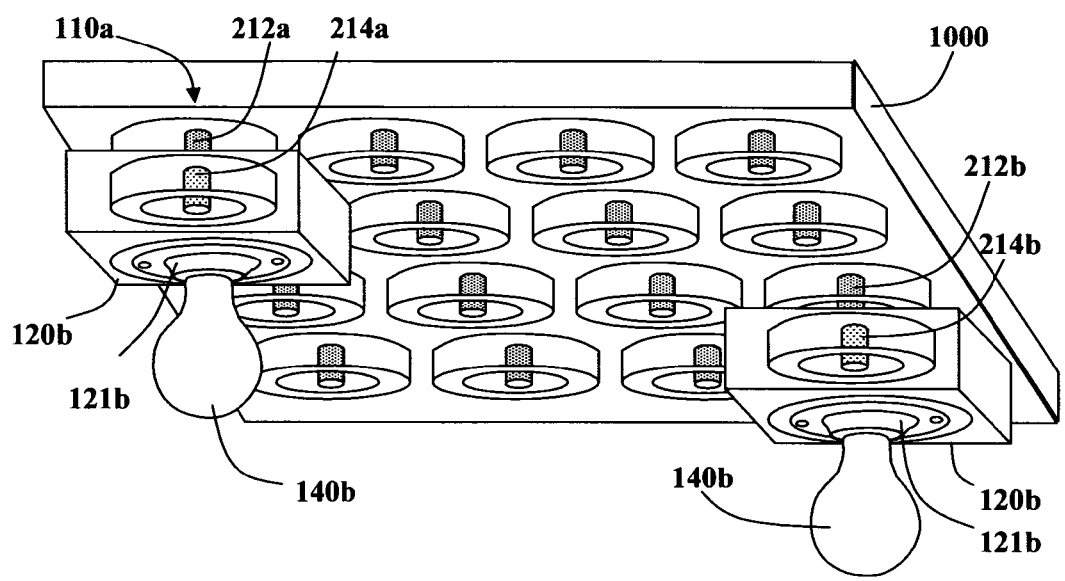

FIG. 12b shows an exemplary power array 1100 that is inverted and horizontal for fixing to a ceiling, for example. Two pinless lighting plugs 120b carrying light sockets 121b for accommodating light bulbs 140b are shown. The lighting plugs 120b are movable and may be coupled to any one of the plurality of pinless power jacks 110 of the power array 1100. In a preferred embodiment, strong magnetic anchors 214 carried by the lighting plugs 120a exert a force upon the magnetic snags 212 embedded in the power array 1100 of sufficient strength to support the weight of the lighting plugs 120a. In this way, pinless lighting plugs 120a may be easily moved and reattached at different locations around the power array 1100.

It will be noted that the power array 1100 shown in FIG. 12b is inverted, allowing lighting plugs 120b to be suspended therebeneath. For many lighting applications, such as for the lighting of a room, such an arrangement is preferred as overhead lighting is less likely to be obscured by objects than lower level lighting. However a lighting power surface may be hung vertically or embedded into a wall, or indeed placed underfoot or in any other orientation.

It is noted that domestic incandescent light bulbs generally require power in the range of 10-150 watts, it is thus desirable for a lighting plug 120b to supply electricity at this power. The inductive transmission of energy in this power range is enabled by the efficient alignment of highly efficient coils such as that shown in the configuration of FIGS. 3a and 3b described herein. Low power lighting solutions, such as fluorescent bulbs, LEDs and the like, typically use lower power plugs.

Figure 12C:
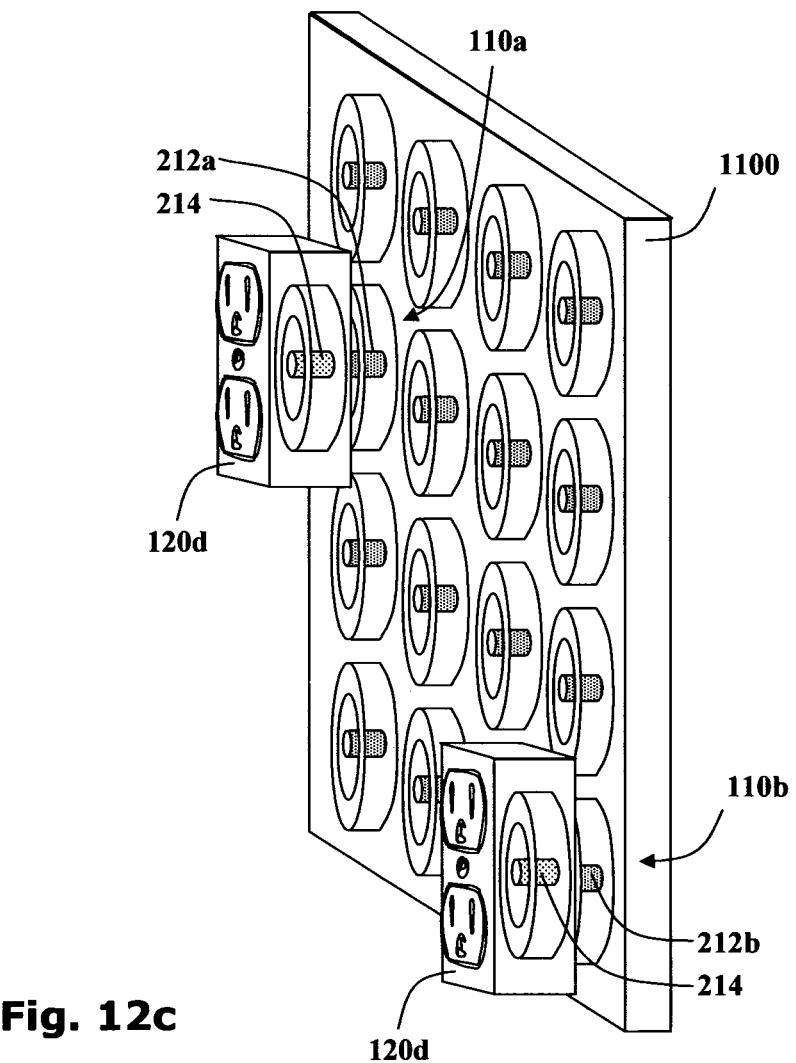

With reference to FIG. 12c, an exemplary vertical power array 1100c is shown which may for example be incorporated into the wall of a room, mounted onto the side of a cabinet or other vertical surface. The power array 1100c is used for providing moveable power outlets 120d into which a pinned plug connected to a power cable (not shown) may be plugged, for coupling an electric load to an inductive power jack 110 and thereby providing power to the electric load.

Two movable power outlets 120*d* are also shown. Each outlet 120*d* includes a magnetic anchor 214 which may be of sufficient strength to support the weight of the movable power outlet 120*d* when coupled to a magnetic snag 212 embedded in the vertical power array 1100*c*. Such outlets 120*d* may thus be freely moved around the vertical power array 1100*c* and located at any position which is aligned to a pinless power jack 110. Furthermore, although a vertical power array 1100*c* is shown in FIG. 12*c*, it will be apparent that movable power outlets 120*d* may be coupled to a power array 1100 in any orientation.

Figure 13:
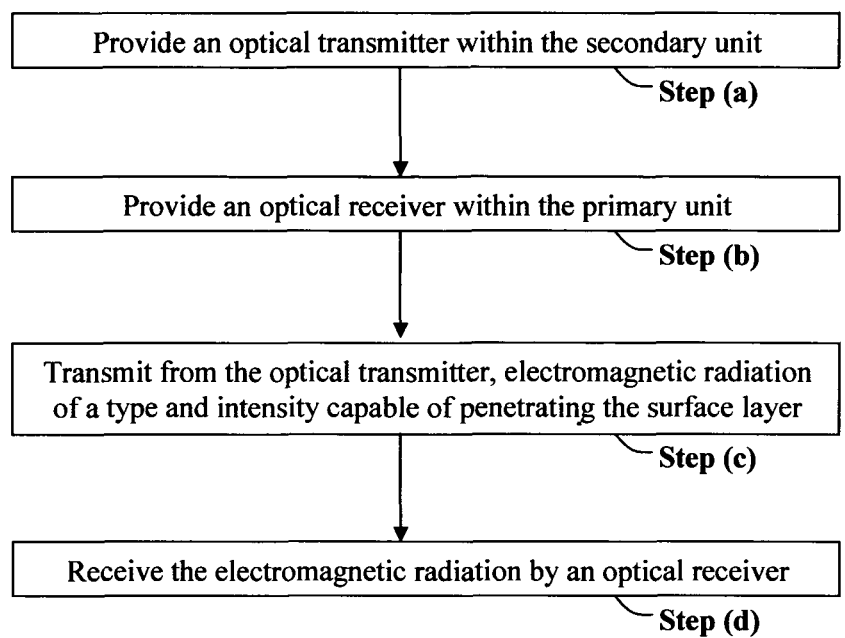
FIG. 13 is a flow diagram flowchart showing a method for transferring an optical regulation signal between a primary unit and a secondary unit via an intermediate layer.

FIG. 13 is a flowchart showing a method for transferring an optical signal between a primary unit and a secondary unit via an intermediate layer. The method comprises the following steps: an optical transmitter is incorporated within the secondary unit—step (a); an optical receiver is incorporated within the primary unit—step (b); the optical transmitter transmits electromagnetic radiation of a type and intensity capable of penetrating the surface layer—step (c); and the optical receiver receives the electromagnetic radiation—step (d).

It will be appreciated that such a method may be applicable to transmitting a regulation signal for regulating power transfer across an inductive coupling by monitoring at least one operating parameter of said electric load and encoding the monitored parameter data into said optical signal. Similarly, data relating to the presence of an electric load, its power requirements, operating voltage, operating current, operating temperature or the like may be communicated.

The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A pinless power coupling system comprising at least one unit selected from:
   at least one pinless power jack, comprising at least one primary coil shielded behind an insulating layer said primary coil for inductively coupling with a secondary coil associated with a pinless power plug in front of said insulating layer, and
   at least one pinless power plug comprising at least one secondary coil for inductive coupling with a primary coil shielded behind an insulating layer associated with a pinless power jack;
   said pinless coupling system being characterized by an alignment mechanism for aligning said pinless power plug to said pinless power jack;
   wherein said alignment mechanism maintains alignment between said power plug and said power jack through 360 degrees of rotation about a central axis.

2. The pinless power coupling system of claim 1, said alignment mechanism comprising an indicator being configured to provide a graduated indication of proximity to full alignment.

3. The pinless power coupling system of claim 1, said alignment mechanism comprising at least one indication selected from the group consisting of:
   a translucent insulating layer through which said primary coil is visible;
   a visible marking on outer surface of said insulating layer to indicate the location of a power jack there within to allow direct visual alignment;
   an illuminated indicator configured to indicate when a plug is aligned to said power jack;
   an illuminated indicator being selected from the group comprising LEDs, LED scales, LCD screens and combinations thereof;
   an audio indicator configured to emit a sound when said plug is aligned to said power jack;
   an audio indicator selected from at least one member of a group consisting of buzzers, bells, speakers, clappers and combinations thereof, and
   a tactile indicator selected from at least one member of a group consisting of a sucker, a hook-and-loop arrangement, a ridge-and-groove arrangement, a magnetic element and combinations thereof.

4. The pinless power coupling system of claim 1, said alignment mechanism comprising at least one magnetic snag incorporated into said power jack configured to magnetically engage with at least one magnetic anchor carried by said power plug, wherein at least one of said magnetic snag and said magnetic anchor comprises a magnetic element characterized by at least one limitation selected from a group consisting of:
   said magnetic element having rotational symmetry such that said magnetic anchor engages said magnetic snag at a plurality of angles;
   said magnetic element having an annular configuration such that said magnetic anchor maintains engagements with said magnetic snag through at least 360 degrees of rotation, and
   said magnetic element being selected from at least one of a group consisting of permanent magnets, electromagnets and ferromagnetic elements.

5. The pinless power coupling system of claim 1 wherein at least one of said primary coil and said secondary coil have a generally annular shape.

6. The pinless power coupling system of claim 5 wherein said annular shape encircles a central axis occupied by at least one of: an optical transmitter, an optical receiver, a magnetic alignment element, an electromagnetic element and a ferromagnetic core.

7. The pinless power coupling system of claim 1 for providing power in the range of between 1 watt to 200 watts.

8. A pinless power coupling system comprising at least one unit selected from:
   at least one pinless power jack, comprising at least one primary coil shielded behind an insulating layer said primary coil for inductively coupling with a secondary coil associated with a pinless power plug in front of said insulating layer, and
   at least one pinless power plug comprising at least one secondary coil for inductive coupling with a primary coil shielded behind an insulating layer associated with a pinless power jack;
   said pinless coupling system being characterized by an alignment mechanism for aligning said pinless power plug to said pinless power jack, said alignment mechanism comprising at least one magnetic snag incorporated into said power jack configured to magnetically engage with at least one magnetic anchor carried by said power plug,
   wherein an electromagnet is incorporated into one or more element selected from the group consisting of:
   said at least one magnetic snag; and
   said at least one magnetic anchor.

* * * * *